US010909628B1

(12) United States Patent
Tofte et al.

(10) Patent No.: US 10,909,628 B1
(45) Date of Patent: Feb. 2, 2021

(54) ACCIDENT FAULT DETERMINATION IMPLEMENTING UNMANNED AERIAL VEHICLES (UAVS)

(71) Applicant: STATE FARM MUTUAL AUTOMOBILE INSURANCE COMPANY, Bloomington, IL (US)

(72) Inventors: Nathan L. Tofte, Downs, IL (US); Timothy W. Ryan, Hudson, IL (US); Nathan W. Baumann, Bloomington, IL (US); Michael Shawn Jacob, Le Roy, IL (US); Joshua David Lillie, Bloomington, IL (US); Brian N. Harvey, Bloomington, IL (US); Roxane Lyons, Chenoa, IL (US); Rosemarie Geier Grant, Ellsworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 748 days.

(21) Appl. No.: 14/858,052

(22) Filed: Sep. 18, 2015

Related U.S. Application Data

(60) Provisional application No. 62/209,963, filed on Aug. 26, 2015, provisional application No. 62/209,627, (Continued)

(51) Int. Cl.
*G06Q 40/08* (2012.01)
*B64C 39/02* (2006.01)
(Continued)

(52) U.S. Cl.
CPC ............ *G06Q 40/08* (2013.01); *B64C 39/024* (2013.01); *B64D 47/08* (2013.01);
(Continued)

(58) Field of Classification Search
CPC ...... G06Q 40/08; G06Q 40/00; B64C 39/024; B64C 2201/00; B64D 47/08; H04N 7/185; G06K 9/00664
(Continued)

(56) References Cited

U.S. PATENT DOCUMENTS 5,686,892 A 11/1997 Smith
6,056,237 A 5/2000 Woodland
(Continued)

FOREIGN PATENT DOCUMENTS

WO 2015/158265 A1 10/2015

OTHER PUBLICATIONS

U.S. Appl. No. 14/510,307, filed Oct. 9, 2014.
(Continued)

*Primary Examiner* — Hani M Kazimi

(57) ABSTRACT

Unmanned aerial vehicles (UAVs) may facilitate insurance-related tasks. UAVs may actively survey an area or be dispatched to the scene of a vehicle collision or crash, such as with an insured's permission, and collect data related to the vehicle collision or crash, such as vehicle data, insurer data, images, video, audio, weather conditions, etc., and transmit this data to a computing device. The computing device may be associated with an insurer and/or utilized by an insurer to perform insurance-related tasks, such as processing the data to assign fault to one or more parties or vehicles, such as autonomous vehicles, involved in the vehicle collision or crash, using the fault assignment to open or otherwise process an insurance claim, modifying a premium price, updating qualified discounts, etc. The drone data may also assist an insurer in opening an insurance claim by prepopulating fields associated with a submitted claim form.

20 Claims, 5 Drawing Sheets

Related U.S. Application Data filed on Aug. 25, 2015, provisional application No. 62/209,755, filed on Aug. 25, 2015, provisional application No. 62/208,201, filed on Aug. 21, 2015, provisional application No. 62/207,421, filed on Aug. 20, 2015, provisional application No. 62/207,127, filed on Aug. 19, 2015, provisional application No. 62/053,519, filed on Sep. 22, 2014.

(51) Int. Cl.

| | | |
|---|---|---|
| *B64D 47/08* | (2006.01) | |
| *H04N 7/18* | (2006.01) | |
| *H04N 5/44* | (2011.01) | |
| *G06K 9/00* | (2006.01) | |
| *G06K 9/52* | (2006.01) | |
| *G06T 7/20* | (2017.01) | |

(52) U.S. Cl.
CPC ..... *G06K 9/00664* (2013.01); *G06K 9/00718* (2013.01); *G06K 9/52* (2013.01); *G06T 7/20* (2013.01); *H04N 5/44* (2013.01); *H04N 7/185* (2013.01); *B64C 2201/00* (2013.01); *G06K 2009/00738* (2013.01); *G06T 2207/30236* (2013.01); *G06T 2207/30252* (2013.01)

(58) Field of Classification Search
USPC .......................................................... 705/4
See application file for complete search history.

(56) References Cited

U.S. PATENT DOCUMENTS

| | | |
|---|---|---|
| 6,166,729 A | 12/2000 | Acosta et al. |
| 7,053,823 B2 | 5/2006 | Cervinka et al. |
| 7,480,715 B1 | 1/2009 | Barker et al. |
| 7,493,211 B2 | 2/2009 | Breen |
| 7,809,587 B2 | 10/2010 | Dorai et al. |
| 7,889,931 B2 | 2/2011 | Webb et al. |
| 7,912,738 B1 | 3/2011 | Martin |
| 7,953,615 B2 | 5/2011 | Aquila et al. |
| 8,019,629 B1 | 9/2011 | Medina et al. |
| 8,069,869 B1 | 12/2011 | Huang |
| 8,095,391 B2 | 1/2012 | Obora et al. |
| 8,239,220 B2 | 8/2012 | Kidd et al. |
| 8,265,963 B1 | 9/2012 | Hanson et al. |
| 8,346,578 B1* | 1/2013 | Hopkins, III ........ G06Q 40/00 382/100 |
| 8,355,966 B1 | 1/2013 | Vu et al. |
| 8,374,957 B1 | 2/2013 | Garcia et al. |
| 8,401,878 B2 | 3/2013 | Stender et al. |
| 8,527,305 B1 | 9/2013 | Hanson et al. |
| 8,537,338 B1 | 9/2013 | Medasani et al. |
| 8,543,486 B2 | 9/2013 | Donoho et al. |
| 8,630,820 B2 | 1/2014 | Amis |
| 8,650,106 B1 | 2/2014 | Hopkins, III |
| 8,700,434 B1* | 4/2014 | DeLong ................ G06Q 50/24 705/4 |
| 8,712,893 B1 | 4/2014 | Brandmaier et al. |
| 8,756,085 B1 | 6/2014 | Tofte et al. |
| 8,799,034 B1* | 8/2014 | Brandmaier ........ G07C 5/008 705/4 |
| 8,818,572 B1 | 8/2014 | Tofte et al. |
| 8,872,818 B2 | 10/2014 | Freeman et al. |
| 8,909,391 B1 | 12/2014 | Peeters et al. |
| 8,948,935 B1 | 2/2015 | Peeters et al. |
| 8,970,400 B2 | 3/2015 | Verna et al. |
| 8,983,682 B1 | 3/2015 | Peeters et al. |
| 9,019,092 B1* | 4/2015 | Brandmaier ........ B60R 25/102 340/426.1 |
| 9,020,536 B1 | 4/2015 | Crossno et al. |
| 9,051,043 B1 | 6/2015 | Peeters et al. |
| 9,069,869 B1 | 6/2015 | Quinn et al. |
| 9,082,015 B2 | 7/2015 | Christopulos et al. |
| 9,129,355 B1 | 9/2015 | Harvey et al. |
| 9,131,224 B1 | 9/2015 | Freeman et al. |
| 9,307,383 B1 | 4/2016 | Patrick |
| 9,505,494 B1 | 11/2016 | Marlow et al. |
| 9,536,148 B2 | 1/2017 | Gross |
| 9,563,201 B1 | 2/2017 | Tofte et al. |
| 9,612,598 B2 | 4/2017 | Schultz et al. |
| 9,646,283 B2 | 5/2017 | Kantor et al. |
| 9,665,094 B1 | 5/2017 | Russell |
| 9,691,103 B1 | 6/2017 | Hopkins, III |
| 9,754,325 B1* | 9/2017 | Konrardy ............... H04W 4/90 |
| 9,792,656 B1* | 10/2017 | Konrardy ............... H04W 4/90 |
| 9,824,397 B1 | 11/2017 | Patel et al. |
| 9,846,915 B2 | 12/2017 | Howe et al. |
| 9,852,487 B1 | 12/2017 | Farnsworth et al. |
| 9,870,609 B2 | 1/2018 | Kompalli et al. |
| 9,875,509 B1 | 1/2018 | Harvey et al. |
| 9,894,327 B1 | 2/2018 | Jacob |
| 9,928,553 B1 | 3/2018 | Harvey et al. |
| 9,972,054 B1* | 5/2018 | Konrardy ................ G07C 5/08 |
| 9,978,030 B2* | 5/2018 | Lim .................. G06Q 10/0633 |
| 10,102,584 B1 | 10/2018 | Devereaux et al. |
| 10,163,162 B1 | 12/2018 | Devereaux et al. |
| 2002/0002475 A1 | 1/2002 | Freedman et al. |
| 2002/0007225 A1 | 1/2002 | Costello et al. |
| 2002/0055861 A1 | 5/2002 | King et al. |
| 2003/0046362 A1 | 3/2003 | Waugh et al. |
| 2003/0069002 A1 | 4/2003 | Hunter et al. |
| 2003/0154111 A1 | 8/2003 | Dutra et al. |
| 2004/0088198 A1 | 5/2004 | Childress et al. |
| 2004/0243423 A1* | 12/2004 | Rix ...................... G06Q 10/10 705/400 |
| 2005/0080649 A1 | 4/2005 | Alvarez et al. |
| 2005/0128074 A1 | 6/2005 | Culpepper et al. |
| 2006/0071783 A1 | 4/2006 | Culpepper et al. |
| 2006/0158328 A1 | 7/2006 | Culpepper et al. |
| 2008/0091490 A1 | 4/2008 | Abrahams et al. |
| 2008/0224854 A1 | 9/2008 | Furey et al. |
| 2008/0255887 A1* | 10/2008 | Gruter ................... G06Q 40/08 705/4 |
| 2009/0002364 A1 | 1/2009 | Witte, II |
| 2009/0027253 A1 | 1/2009 | Van et al. |
| 2009/0055226 A1 | 2/2009 | Tritz et al. |
| 2009/0138290 A1* | 5/2009 | Holden ................. G06Q 40/08 705/4 |
| 2009/0157437 A1 | 6/2009 | Becerra et al. |
| 2009/0219393 A1 | 9/2009 | Vian et al. |
| 2009/0265193 A1* | 10/2009 | Collins .............. G06Q 30/0185 705/4 |
| 2010/0012769 A1 | 1/2010 | Alber et al. |
| 2010/0156816 A1* | 6/2010 | Relyea, Jr. ............ G06F 3/0488 345/173 |
| 2010/0215212 A1 | 8/2010 | Flakes, Jr. |
| 2010/0250022 A1 | 9/2010 | Hines et al. |
| 2010/0274606 A1 | 10/2010 | Fain et al. |
| 2010/0302359 A1 | 12/2010 | Adams et al. |
| 2011/0046920 A1* | 2/2011 | Amis ...................... G01S 19/16 702/181 |
| 2011/0130636 A1 | 6/2011 | Daniel et al. |
| 2011/0137443 A1 | 6/2011 | Farahani |
| 2011/0161118 A1 | 6/2011 | Borden et al. |
| 2012/0033821 A1 | 2/2012 | Ohta et al. |
| 2012/0033851 A1 | 2/2012 | Chen et al. |
| 2012/0071998 A1 | 3/2012 | Davies et al. |
| 2012/0140041 A1 | 6/2012 | Burgunder et al. |
| 2012/0210853 A1 | 8/2012 | Abershitz et al. |
| 2012/0250010 A1 | 10/2012 | Hannay |
| 2012/0299751 A1 | 11/2012 | Verna et al. |
| 2012/0303336 A1 | 11/2012 | Becker et al. |
| 2013/0033381 A1 | 2/2013 | Breed |
| 2013/0033851 A1 | 2/2013 | Wang |
| 2013/0226624 A1 | 8/2013 | Blessman et al. |
| 2014/0019166 A1 | 1/2014 | Swanson et al. |
| 2014/0058763 A1 | 2/2014 | Zizzamia et al. |
| 2014/0068413 A1 | 3/2014 | Christensen |
| 2014/0100889 A1 | 4/2014 | Tofte |
| 2014/0111332 A1 | 4/2014 | Przybylko et al. |
| 2014/0163852 A1* | 6/2014 | Borri ...................... G08G 5/0026 701/120 |

(56) References Cited

U.S. PATENT DOCUMENTS

| | | |
|---|---|---|
| 2014/0168420 A1 | 6/2014 | Naderhirn et al. |
| 2014/0244078 A1 | 8/2014 | Downey et al. |
| 2014/0245210 A1 | 8/2014 | Battcher et al. |
| 2014/0257862 A1 | 9/2014 | Billman et al. |
| 2014/0316614 A1 | 10/2014 | Newman |
| 2014/0320651 A1 | 10/2014 | McClatchie et al. |
| 2014/0324405 A1 | 10/2014 | Plummer et al. |
| 2014/0353422 A1 | 12/2014 | Westbrook, Sr. |
| 2015/0019267 A1 | 1/2015 | Prieto et al. |
| 2015/0020558 A1 | 1/2015 | Williams |
| 2015/0046194 A1 | 2/2015 | Waddell et al. |
| 2015/0140954 A1 | 5/2015 | Maier et al. |
| 2015/0161277 A1 | 6/2015 | Heller et al. |
| 2015/0245210 A1 | 8/2015 | Kwon et al. |
| 2015/0254738 A1* | 9/2015 | Wright, III ......... G06Q 30/0284 705/26.81 |
| 2015/0323932 A1 | 11/2015 | Paduano et al. |
| 2015/0348204 A1 | 12/2015 | Daues |
| 2015/0363717 A1 | 12/2015 | Lim |
| 2016/0063642 A1* | 3/2016 | Luciani ................. G06Q 40/08 705/4 |
| 2016/0071217 A1 | 3/2016 | Edwards et al. |
| 2016/0071379 A1 | 3/2016 | McKiel, Jr. |
| 2016/0088286 A1 | 3/2016 | Forsythe et al. |
| 2016/0111006 A1 | 4/2016 | Srivastava et al. |
| 2016/0189303 A1* | 6/2016 | Fuchs .................... G06Q 40/08 705/4 |
| 2016/0216711 A1 | 7/2016 | Srivastava et al. |
| 2017/0083979 A1 | 3/2017 | Winn et al. |
| 2017/0210451 A1* | 7/2017 | Oh ............................ B63C 9/22 |
| 2017/0352100 A1 | 12/2017 | Shreve et al. |
| 2018/0279105 A1 | 9/2018 | Huber et al. |

OTHER PUBLICATIONS

U.S. Appl. No. 14/510,492, filed Oct. 9, 2014.
U.S. Appl. No. 14/510,536, filed Oct. 9, 2014.
U.S. Appl. No. 14/808,502, filed Jul. 24, 2015.
U.S. Appl. No. 14/858,038, filed Sep. 18, 2015.
U.S. Appl. No. 14/858,034, filed Sep. 18, 2015.
U.S. Appl. No. 14/858,058, filed Sep. 18, 2015.
U.S. Appl. No. 14/858,075, filed Sep. 18, 2015.
U.S. Appl. No. 14/858,699, filed Sep. 18, 2015.
U.S. Appl. No. 14/858,073, filed Sep. 18, 2015.
U.S. Appl. No. 14/858,076, filed Sep. 18, 2015.
U.S. Appl. No. 14/824,859, filed Aug. 12, 2015.
Sorcher, Sara, "What Drones Can Do for You", National Journal; Washington, Apr. 11, 2013, pp. 1-4. (Year: 2013).
Ying Liu, Xiaozhong Li, Dan Wang, Lixin Cui, The bounds of premium and a fuzzy insurance model under risk aversion utility preference, Jul. 1, 2017, 2017 13th International Conference on Natural Computation, Fuzzy Systems and Knowledge Discovery ( ICNC-FSKD) (pp. 1357-1362). (Year: 2017).
Costonis, Michael, "Better Insurer Service Can Reduce Consumer Tolerance Schemes," Journal of Insurance Fraud in America (Fall 2011).
Frey, Thomas, "192 Future Uses for Flying Drones," Business Trends. (Sep. 2, 2014).
How Do Body Shops Estimates Affect Car Insurance Claims?. Car Insurance Quotes.com. Aug. 19, 2013 (2 pages). (Year: 2013).

* cited by examiner

ACCIDENT FAULT DETERMINATION IMPLEMENTING UNMANNED AERIAL VEHICLES (UAVS)

CROSS REFERENCE TO RELATED APPLICATIONS

This application claims the benefit of (1) U.S. Provisional Patent Application No. 62/053,519, entitled "Method of Implementing Unmanned Aerial Vehicles (UAVs)," filed Sep. 22, 2014, (2) U.S. Provisional Patent Application No. 62/209,963, entitled "Disaster Damage Analysis and Loss Mitigation Implementing Unmanned Aerial Vehicles (UAVs)," filed Aug. 26, 2015, (3) U.S. Provisional Patent Application No. 62/207,421 entitled "Insurance Underwriting and Re-Underwriting Implementing Unmanned Aerial Vehicles (UAVs)," filed Aug. 20, 2015, (4) U.S. Provisional Patent Application No. 62/207,127 entitled "Accident Reconstruction Implementing Unmanned Aerial Vehicles (UAVs)," filed Aug. 19, 2015, (5) U.S. Provisional Patent Application No. 62/209,755 entitled "Systems and Methods of Utilizing Unmanned Aerial Vehicles to Detect Insurance Claim Buildup," filed Aug. 25, 2015, (6) U.S. Provisional Patent Application No. 62/209,627 entitled "Systems and Methods for Using Data Collected from Unmanned Aerial Vehicles to Pre-Generate Claims for Insured Approval," filed Aug. 25, 2015, and (7) U.S. Provisional Patent Application No. 62/208,201 entitled "Loss Mitigation Implementing Unmanned Aerial Vehicles (UAVs)," filed Aug. 21, 2015, the disclosure of each of which is hereby expressly incorporated by reference herein in its entirety.

This application is also related to U.S. Nonprovisional patent application Ser. No. 14/824,859 entitled "Accident Fault Determination Implementing Unmanned Aerial Vehicles (UAVs)," filed Aug. 12, 2015, the disclosure of which is hereby expressly incorporated by reference herein in its entirety.

FIELD OF THE DISCLOSURE

The present embodiments relate generally to applications of unmanned aerial vehicles (UAVs). More specifically, the present embodiments relate to using data collected by one or more UAVs as part of an insurance claim process.

BACKGROUND

Conventionally, performing insurance-related actions such as allocating the fault for a vehicle collision or crash, and/or opening an insurance claim involve an arduous and time-consuming manual process that requires a large component of human intervention.

The present embodiments may overcome these and/or other deficiencies.

BRIEF SUMMARY

Methods, systems, apparatus, and non-transitory computer-readable media are described that leverage the use of one or more unmanned aerial vehicles (UAVs, or "drones") to facilitate one or more insurance-related tasks. In various embodiments, one or more UAVs may actively survey an area or be dispatched to the scene of a vehicle collision or crash, which may occur manually or as part of an automated or semi-automated process. Once at the scene of the vehicle collision or crash, one or more UAVs may collect data related to the vehicle collision or crash, such as vehicle data, insurer data, images, video, weather conditions, audio and/or recorded statements given by witnesses and/or other persons associated with the vehicle collision or crash, etc.

The one or more UAV's may transmit this data to a remote server as drone data, which may be associated with an insurer and/or utilized by an insurer to perform one or more insurance-related tasks, such as processing the data to allocate a percentage fault to one or more parties involved in the vehicle collision or crash, using the fault allocation to open or otherwise process an insurance claim, modifying a premium price, updating qualified discounts, etc. The drone data may also be used to assist an insurer in opening an insurance claim by prepopulating fields associated with a submitted claim form.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

I. System Overview

Figure 1:
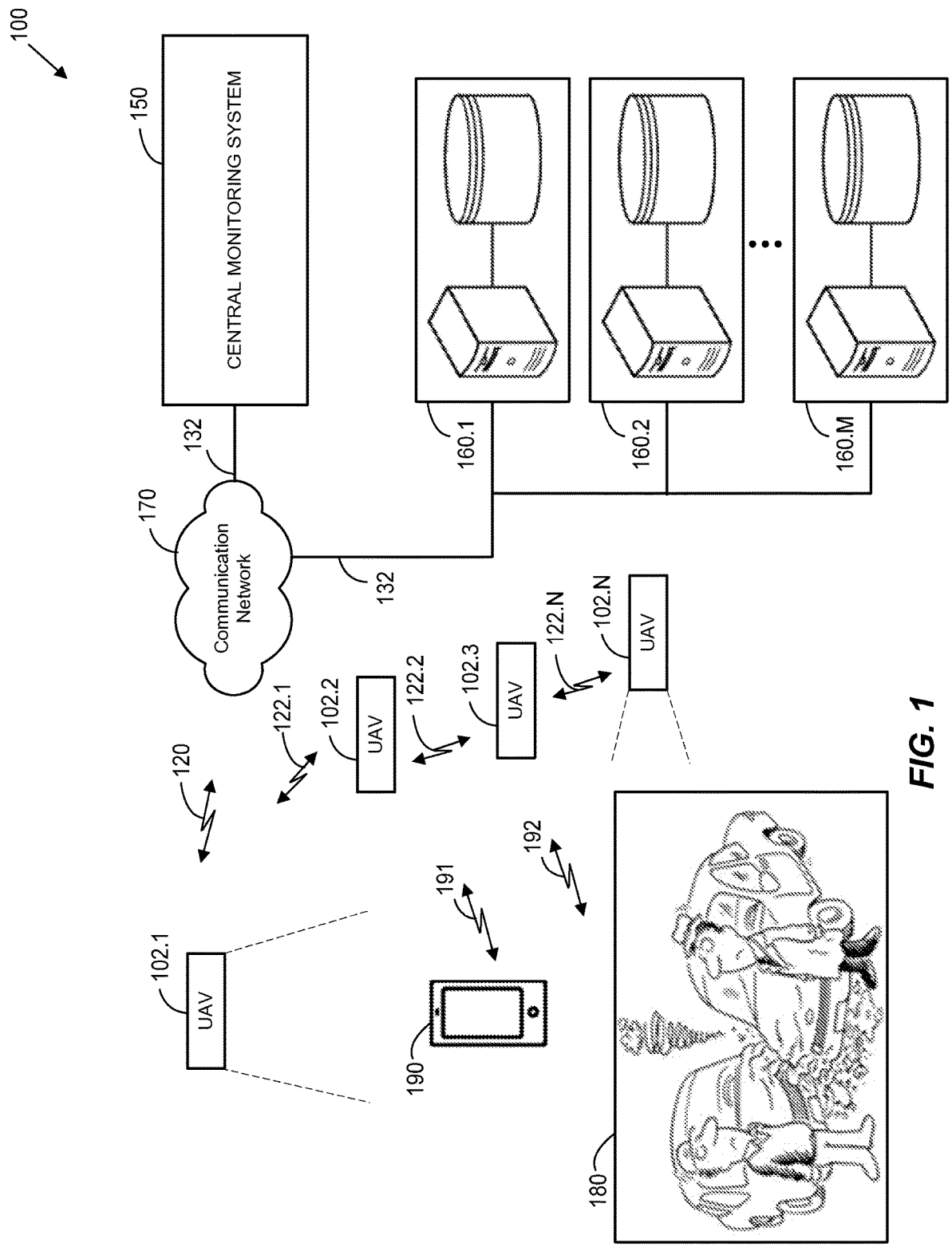
FIG. 1 illustrates an exemplary block diagram of a UAV data collection system 100.

FIG. 1 illustrates an exemplary block diagram of a UAV data collection system 100. UAV data collection system 100 may include any suitable number N of UAVs 102.1-102.N, a central monitoring system 150, any suitable number M of external computing devices 160.1-160.M, a communication network 170, the scene of a vehicle collision or crash 180, and one or more mobile computing devices 190. UAV data collection system 100 may include additional, fewer, or alternate components, including those discussed elsewhere herein.

In various aspects, any suitable number of UAVs 102.1-102.N may communicate with one another and/or with communication network 170. One or more of UAVs 102.1-102.N may receive commands from other UAVs 102 and/or via communication network 170, process these commands, and execute one or more actions based upon these received commands. One or more of UAVs 102.1-102.N may also transmit data to other UAVs 102.1-102.N and/or to communication network 170.

As is further discussed below, by nature of the connectivity of central monitoring system 150 and external computing devices 160.1-160.M to communication network 170, UAVs 102.1-102.N, central monitoring system 150, external computing devices 160.1-160.M, and/or mobile computing device 190 may communicate with one another. For example, UAV 102.1 may communicate with communication network 170 via wireless link 120, while central monitoring system 150 and external computing devices 160.1-160.M may communicate with communication network 170 via wired links 132. To provide another example, mobile computing device 190 may communicate with communication network 170 via wireless link 191 to send data to and receive data from other devices, such as UAVs 102.1-102.N, central monitoring system 150, and/or external computing devices 160.1-160.M, for example, directly and/or via communication network 170. To provide yet another example, one or more vehicles may communicate with communication network 170 via wireless link 192 to send telematics data to other devices, such as UAVs 102.1-102.N, central monitoring system 150, and/or external computing devices 160.1-160.M, for example, directly and/or via communication network 170.

Communications between UAVs 102.1-102.N, central monitoring system 150, external computing devices 160.1-160.M, and/or mobile computing device 190 may occur with or without communications via communication network 170, in some aspects. For example, UAVs 102.1-102.N may communicate with one another directly via wireless links 122.1-122.N, as shown in FIG. 1.

In various aspects, communications between one or more of UAVs 102.1-102.N, central monitoring system 150, one or more of external computing devices 160.1-160.M, and/or mobile computing device 190 may occur in accordance with any suitable number and/or type of communication protocols, which may be wireless communication protocols, wired communication protocols, or any combination thereof. Furthermore, in various aspects, UAVs 102.1-102.N, central monitoring system 150, external computing devices 160.1-160.M, and/or mobile computing device 190 may communicate with one another and/or with communication network 170 using the same or different types of communication protocols.

For example, one or more of UAVs 102.1-102.N may communicate with one another using a short-range wireless communication protocol, such as Wi-Fi protocol, but communicate with communication network 170, and hence with central monitoring system 150 and/or external computing devices 160.1-160.M, via a cellular protocol. To provide another example, central monitoring system 150 and/or external computing devices 160.1-160.M may communicate with communication network 170, and hence with one another, via an Ethernet protocol.

In some aspects, one or more of UAVs 102.1-102.N may communicate with one another to perform tasks as an intelligent group, thereby acting as and communicating with one another as a drone swarm. In other aspects, one or more of UAVs 102.1-102.N may be controlled individually by other UAVs 102.1-102.N, by central monitoring system 150, by one or more external computing devices 160.1-160.M, and/or mobile computing device 190. Individual control of one or more of UAVs 102.1-102.N may be implemented, for example, via a unique UAV address, a unique frequency channel, a unique code (e.g., a pseudo noise code (PN code) or a pseudo random noise code (PRN code), etc.

As will further discussed below, one or more UAVs 102.1-102.N may execute any suitable action based upon a particular application and/or command that is transmitted to one or more UAVs 102.1-102.N, and/or execute any suitable action autonomously or semi-autonomously. For example, one or more UAVs 102.1-102.N may take aerial pictures or collect sensory data associated with the scene of vehicle collision or crash 180, navigate to the scene of vehicle collision or crash 180 to perform various actions, facilitate interaction with a person associated with the scene of vehicle collision or crash 180, collect driver and/or vehicle information, collect images, video, audio, etc.

In various aspects, one or more UAVs 102.1-102.N may be implemented as any suitable type of UAV. For example, one or more UAVs 102.1-102.N may be equipped with any suitable number of propellers, wings, and/or engines to facilitate sustained flight, maneuvering, and/or the execution of various tasks as further discussed herein. For example, one or more UAVs 102.1-102.N may be implemented as quadracopters, flying wings, etc., and may utilize any suitable type of navigation and/or maneuvering control, such as collision-avoidance systems, detect-and-avoid systems, etc.

Communication network 170 may include any appropriate combination of wired and/or wireless communication networks. For example, communication network 170 may include any combination of satellites, a local area network (LAN), a metropolitan area network (MAN), a wide area network (WAN), public switched telephone networks (PSTN), etc., and may facilitate a connection to the Internet for one or more devices communicatively coupled thereto. To provide further examples, communication network 170 may include wired telephone and/or cable hardware, satellite, cellular phone communication networks, etc.

Communication network 170 is shown in FIG. 1 as a single network for purposes of brevity, but may represent more than one type of network and/or an aggregation of several networks. For example, one or more of UAVs 102.1-102.N may communicate with satellites via communication network 170 to supplement lost communications (not shown) and/or communicate with central monitoring system 108 via a cellular network system.

Central monitoring system 150 may be implemented as any suitable device configured to communicate with, command, and/or control one or more UAVs 102.1-102.N. Furthermore, central monitoring system 150 may be implemented as any suitable device configured to receive data from one or more UAV's 102.1-102.N, and to share this data or otherwise make this data available to one or more external computing devices 160.1-160.M.

In some aspects, central monitoring system 150 may be configured to communicate with, command, and/or control one or more UAVs 102.1-102.N individually or as part of a UAV swarm protocol. For example, UAVs 102.1-102.N may include a hierarchy of UAVs in which some of UAVs 102.1-102.N may act as "mothership" UAVs and exert control over other UAVs. Aspects include central monitoring system 150 communicating with, commanding, and/or controlling one or more of UAVs 102.1-102.N via any suitable combination of direct control and/or swarm control techniques.

For example, central monitoring system 150 may be implemented as one or more computers, laptops, mobile devices such as a smartphones, tablet computers, netbooks, notebooks, phablets, wearable electronic devices, smart glasses, etc. In one aspect, central monitoring system 150 may be implemented as one or more specialized components configured to monitor and/or control one or more UAVs 102.1-102.N. For example, central monitoring system 150 may be implemented as a computerized system configured to dispatch one or more UAVs 102.1-102.N, to command one or more UAVs 102.1-102.N to perform various data collection tasks, to navigate one or more UAVs 102.1-102.N to a specific geographic location for repairs, recharging and/or refueling, etc.

In some embodiments, central monitoring system 150 may function automatically or semi-automatically with no user intervention or minimal user intervention, respectively. For example, central monitoring system 150 may be implemented with one or more computing devices that are programmed to receive instructions from one or more external computing devices 160.1-160.M, and to command, control, and/or communicate with one or more UAVs 102.1-102.N based upon these instructions.

In other embodiments, central monitoring system 150 may be staffed with personnel trained to command, control, and/or communicate with one or more UAVs 102.1-102.N based upon a particular scenario or application. For example, a driver at the scene of vehicle collision or crash 180 may call or otherwise report (e.g., via data sent via a mobile computing device application running on mobile computing device 190) that she was involved in a vehicle collision or crash. Trained personnel may utilize one or more computing devices implemented by central monitoring system 150 to dispatch one or more UAVs 102.1-102.N to the scene of the vehicle collision or crash 180 to collect data, receive data from one or more UAVs 102.1-102.N, make this data available for insurance-related purposes, etc.

One or more computing devices 160.1-160.M may be implemented as any suitable number and/or type of computing devices configured to facilitate insurance-related tasks using data collected from one or more UAVs 102.1-102.N. For example, one or more computing devices 160.1-160.M may be part of an insurer computing system, and as such may access insurer databases, algorithms, applications, remote servers, remote processors, etc., as needed to perform insurance-related functions using data collected from one or more UAVs 102.1-102.N. To provide another example, one or more computing devices 160.1-160.M may access traffic video data, access weather data, access various private and/or municipal surveillance systems access various security monitoring systems, etc.

In various aspects, one or more UAVs 102.1-102.N, central monitoring system 150, one or more computing devices 160.1-160.M, and/or mobile computing device 190 may share one or more functions such that either of one or more UAVs 102.1-102.N, central monitoring system 150, one or more UAVs 102.1-102.N, and/or mobile computing device 190 may perform any portion (or all) of the functions otherwise performed by the other components. Furthermore, functions may be performed by one or more UAVs 102.1-102.N, central monitoring system 150, one or more computing devices 160.1-160.M, and/or mobile computing device 190 working in concert with one another.

For example, as will be further discussed herein, one or more UAVs 102.1-102.N may analyze collected drone data locally or transmit the drone data to central monitoring system 150 and/or one or more computing devices 160.1-160.M for further analysis, thereby offloading these tasks.

To provide additional examples, in some aspects, central monitoring system 150 and/or one or more computing devices 160.1-160.M may perform the same functions as one another in some aspects, while performing separate, dedicated functions in other aspects. That is, the command, control, and communication functions performed by central monitoring system 150 may be alternatively or additionally performed by one or more computing devices 160.1-160.M. Furthermore, the insurance-related functions performed by one or more computing devices 160.1-160.M may be alternatively or additionally performed by central monitoring system 150.

To provide yet another example, one or more of UAVs 102.1-102.N may function as a central monitoring system, performing command, control, and communication functions over other UAVs 102.1-102.N. These aspects may be particularly useful when one or more of UAVs 102.1-102.N is configured to navigate and communicate with one another in accordance with a swarm protocol.

II. Exemplary UAV or Drone

Figure 2:
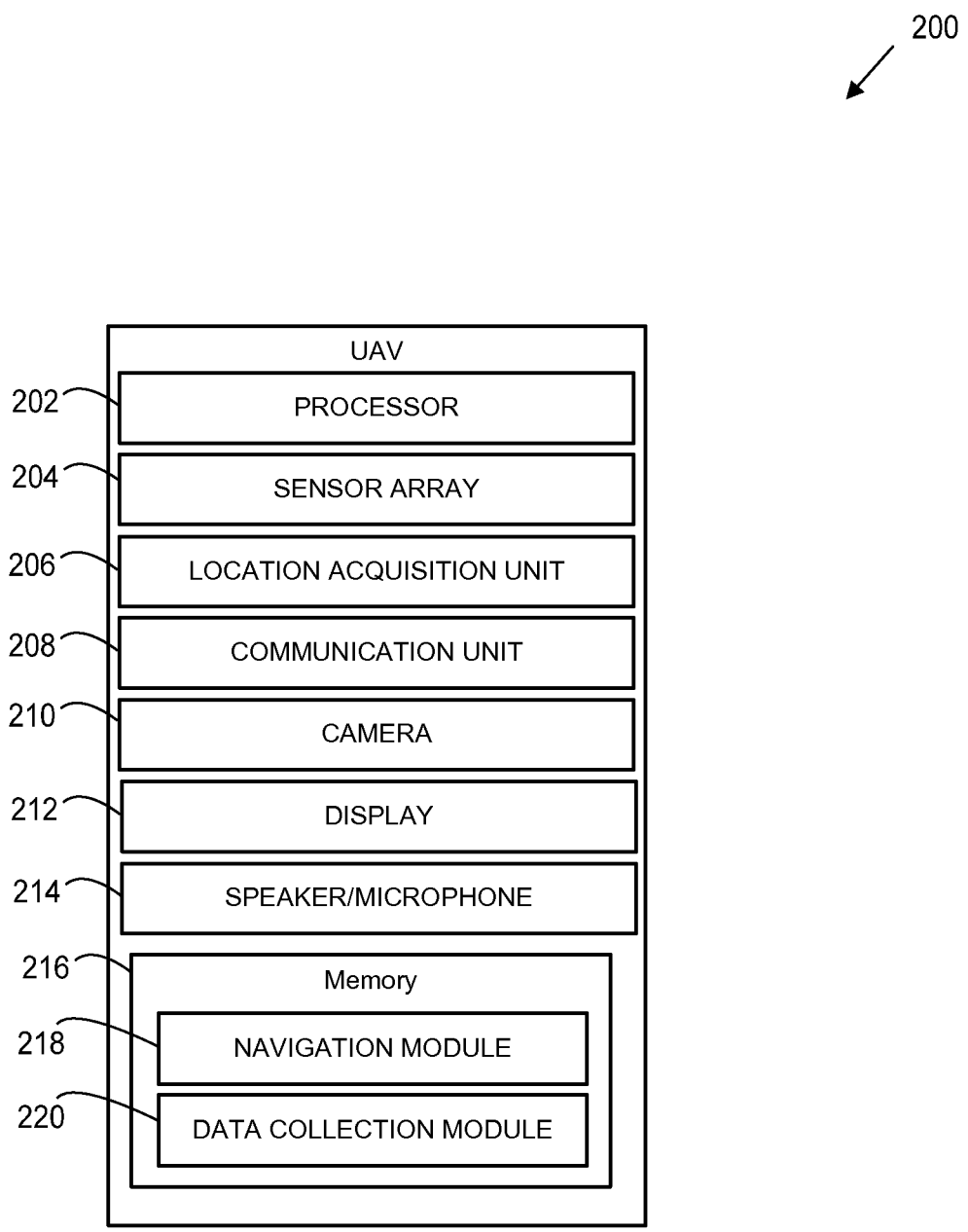
FIG. 2 illustrates an exemplary block diagram of a UAV 200.

FIG. 2 illustrates an exemplary block diagram of a UAV 200. UAV 200 may include a processor 202, a sensor array 204, a location acquisition unit 206, a communication unit 208, a camera 210, a display 212, a speaker/microphone 214, and a memory 216. In one aspect, UAV 200 is an implementation of one of UAVs 102.1-102.N, as shown in FIG. 1. UAV 200 may include additional, fewer, or alternate components, including those discussed elsewhere herein.

Processor 202 may be implemented as any suitable type and/or number of processors, such as a host processor of UAV 200, for example. To provide additional examples, processor 202 may be implemented as an application specific integrated circuit (ASIC), an embedded processor, a central processing unit (CPU) associated with UAV 200, a graphical processing unit (GPU), etc.

Processor 202 may be configured to communicate with one or more of sensor array 204, location acquisition unit 206, communication unit 208, camera 210, display 212, speaker/microphone 214, and/or memory 216 via one or more wired and/or wireless interconnections, such as any suitable number of data and/or address buses, for example. These interconnections are not shown in FIG. 2 for purposes of brevity.

Processor 202 may be configured to operate in conjunction with one or more of sensor array 204, location acquisition unit 206, communication unit 208, camera 210, display 212, speaker/microphone 214, and/or memory 216 to process and/or analyze data, to store data to memory 216, to retrieve data from memory 216, to cause instructions, alerts and/or notifications to be displayed via display 212 and/or to be sounded via speaker/microphone 214, to receive, process, and/or interpret communications, commands, and/or controls received via communication unit 208, to receive, process, store, and/or interpret data measured and/or generated via sensor array 204, to receive, store, and/or transmit images and/or video captured via camera 210, to execute one or more functions related to the navigation of UAV 200, to receive data from and/or send data to one or more of central monitoring system 150, to another UAV (e.g., one or more of UAVs 102.1-102.N), to one or more of external computing devices 160.1-160.M, etc.

Sensor array 204 may be configured to collect information in accordance with any suitable number of implemented sensors, to store the collected information as drone data in any suitable portion of memory 216, and/or to transmit the drone data to one or more of central monitoring system 150, another UAV (e.g., one or more of UAVs 102.1-102.N), and/or one or more of external computing devices 160.1-160.M.

Sensor array 204 may be implemented as any suitable number and/or type of sensors configured to measure, monitor, and/or quantify one or more characteristics of UAV 200's environment as part of collected drone data.

Examples of suitable sensor types implemented by sensor array 204 may include one or more accelerometers, gyroscopes, compasses, speedometers, magnetometers, barometers, thermometers, proximity sensors, light sensors (e.g., light intensity detectors), electromagnetic radiation sensors (e.g., infrared and/or ultraviolet radiation sensors), ultrasonic and/or infrared range detectors, humistors, hygrometers, altimeters, microphones, Light Detection and Ranging (LiDAR) sensors, ground penetrating radio detection and ranging (RADAR), etc. Sensor array 204 may additionally or alternatively include advanced sensors, for example, that detect and/or receive data associated with temperature measurements, thermal imaging, weather conditions, traffic conditions, etc.

Location acquisition unit 206 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe.

Location acquisition unit 206 and/or processor 202 may be configured to receive navigational signals from one or more satellites and to calculate a geographic location of UAV 200 using these signals. Location acquisition unit 206 may include one or more processors, controllers, or other computing devices and memory to calculate the geographic location of UAV 200 without processor 202, or location acquisition unit 206 may utilize components of processor 202. Thus, processor 202 and location determining component 206 may be combined or be separate or otherwise discrete elements.

Although aspects of UAV 200 may include a satellite navigation receiver, any suitable location-determining technology may be used. For example, communication unit 208 may determine the location of UAV 200 by receiving data from transmitter locations and then performing basic triangulation calculations to determine the relative position of UAV 200 with respect to the transmitting locations. For example, cellular towers or any customized transmitting radio frequency towers may be used instead of, or in addition to, satellites.

Communication unit 208 may be configured to support any suitable number and/or type of communication protocols to facilitate communications between UAV 200 and one or more other devices, such as one or more of central monitoring system 150, another UAV (e.g., one or more of UAVs 102.1-102.N), one or more of external computing devices 160.1-160.M, and/or mobile computing device 190, for example, as shown in FIG. 1. Communication unit 208 may be configured to send and receive data directly and/or indirectly (e.g., via communication network 170).

Communication unit 208 may be configured to receive any suitable type of information via one or more of central monitoring system 150, another UAV (e.g., one or more of UAVs 102.1-102.N), one or more of external computing devices 160.1-160.M, and/or mobile computing device 190. Furthermore, communication unit 208 may likewise be configured to transmit any suitable type of information to one or more of central monitoring system 150, another UAV (e.g., one or more of UAVs 102.1-102.N), one or more of external computing devices 160.1-160.M, and/or mobile computing device 190. Communication unit 208 may be implemented with any suitable combination of hardware and/or software to facilitate this functionality. For example, communication unit 208 may be implemented having any suitable number of wired and/or wireless transceivers, ports, connectors, antennas, etc.

Camera 210 may be configured to capture one or more digital images and/or video data, for example. In various aspects, camera 210 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality.

Camera 210 may be coupled to one or more servos that are controlled via processor 202 to obtain images and/or video from one or more locations, such as the scene of the vehicle collision or crash 180, for example, as shown in FIG. 1. Camera 210 may include any suitable number of cameras, which may include cameras that capture image data in both the visible and the non-visible spectrum, such as digital and thermal imaging cameras, for example. Camera 210 may be configured to store image data to any suitable portion of memory 216.

Display 212 may be configured to display one or more images, messages, instructions, etc., in response to data received from processor 202. Display 212 may be implemented as any suitable type of display, and may facilitate user interaction with UAV 200. For example, display 212 may be implemented as a capacitive touch screen display, a resistive touch screen display, a standard display (a non-touch display), etc. In various aspects, display 212 may be configured to work in conjunction with processor 202 to detect user inputs upon a user selecting a displayed interactive icon or other graphic, to identify user selections of objects displayed via display 212, to display instructions and/or prompts to facilitate collecting information regarding a vehicle collision or crash, etc. Additionally or alternatively, information displayed via display 212 may be in the form of audible announcements made via speaker/microphone 214.

In accordance with various aspects, memory 216 may be a computer-readable non-transitory storage device that may include any suitable combination of volatile memory (e.g., a random access memory (RAM) or non-volatile memory (e.g., battery-backed RAM, FLASH, etc.). Memory 216 may be configured to store instructions executable on processor 202, such as the various memory modules illustrated in FIG. 2 and further discussed below, for example. These instructions may include machine readable instructions that, when executed by processor 202, cause processor 202 to perform various acts as described herein.

Navigation module 218 is a region of memory 216 configured to store instructions that, when executed by processor 202, cause processor 202 to perform various acts in accordance with applicable aspects as described herein.

In one aspect, navigation module 218 may be a portion of memory 216 configured to store instructions, that when executed by processor 202, cause processor 202 to control the speed, direction, route, and/or altitude of UAV 200. For example, executable instructions stored in navigation module 218 may enable processor 202 to determine a destination specified as geographic location coordinates received as part of a command via communication unit 208, to determine a current geographic location of UAV 200 via location acquisition unit 206, and/or to execute the appropriate controls to maneuver UAV 200 to the destination.

To provide another example, navigation module 218 may be a portion of memory 216 configured to store instructions, that when executed by processor 202, cause processor 202 to issue a command to another UAV (e.g., one or more of UAVs 102.1-102.N), thereby causing that UAV to navigate to a particular geographic location.

In some embodiments, navigation of UAV 200 may be performed with the assistance of one or more persons controlling UAV 200. For example, personnel associated with central monitoring system 150 may use image and/or video captured by camera 210 as feedback and manually direct UAV 200. For example, a person may use a controller implemented by central monitoring system 150 that receives control inputs that are interpreted, translated, and transmitted as commands to UAV 200.

In other aspects, navigation may be performed by UAV 200 autonomously or with minimal assistance from one or more persons. For example, executable instructions stored in navigation module 218 may enable processor 202 to utilize image and/or video captured by camera 210 and to analyze the image and/or video in accordance with any suitable image recognition, object recognition, and/or machine vision algorithms. UAV 200 may use the outcome of such analyses to complete a requested task.

That is, in manually controlled aspects, UAV 200 may navigate to various locations when being controlled by a person via central monitoring system 150. However, in autonomous or semi-autonomous embodiments, UAV 200 may receive a command having a higher level structure, such as a command requesting UAV 200 to navigate to a particular distance from a vehicle identified in the video (e.g., one that is selected via a user through an appropriate user input gesture), in which case UAV may carry out this task without further user assistance.

Data collection module 220 is a region of memory 216 configured to store instructions that, when executed by processor 202, cause processor 202 to perform various acts in accordance with applicable aspects as described herein. In one aspect, data collection module 220 may be a portion of memory 216 configured to store instructions, that when executed by processor 202, cause processor 202 to collect data associated with one or more locations in which UAV 200 is dispatched or otherwise directed. Similar to the navigation processes described above, UAV 200 may likewise perform data collection processes via manually, autonomously, or semi-autonomously.

Regardless of how the data is collected, aspects include UAV 200 collecting drone data that is used to facilitate one or more insurance-related tasks and/or to determine the fault or persons or vehicles associated with a vehicle collision or crash. These insurance-related tasks and how the drone data is used for each of these tasks is further discussed below with reference to FIG. 4. The drone data may include, for example, any suitable data received via one or more of sensor array 204, location acquisition unit 206, and/or camera 210.

To provide an illustrative example, UAV 200 may be instructed to navigate to the scene of the vehicle collision or crash 180 to collect audio and/or visual data, such as images, video, and/or sound recorded via camera 210 and/or sensor array 204. The images or videos may include any suitable content that may be used by an insurer for the various insurance-related tasks, as further discussed below. For example, the images or videos may reveal the type of intersection, road lighting conditions, current traffic conditions, the time of day, weather conditions, etc.

To provide another example, UAV 200 may perform interviews with drivers, passengers, witnesses, and/or other persons involved in a vehicle collision or crash. UAV 200 may provide prompts and/or instructions via display 212 and/or speaker/microphone 214, record responses to the prompts as audio and/or video data, instruct persons being interviewed how to respond, store these interviews in a suitable portion of memory 216, and/or transmit these responses to one or more of central monitoring system 150, another UAV (e.g., one or more of UAVs 102.1-102.N), one or more of external computing devices 160.1-160.M, mobile computing device 190, etc.

III. Exemplary Mobile Computing Device

Figure 3:
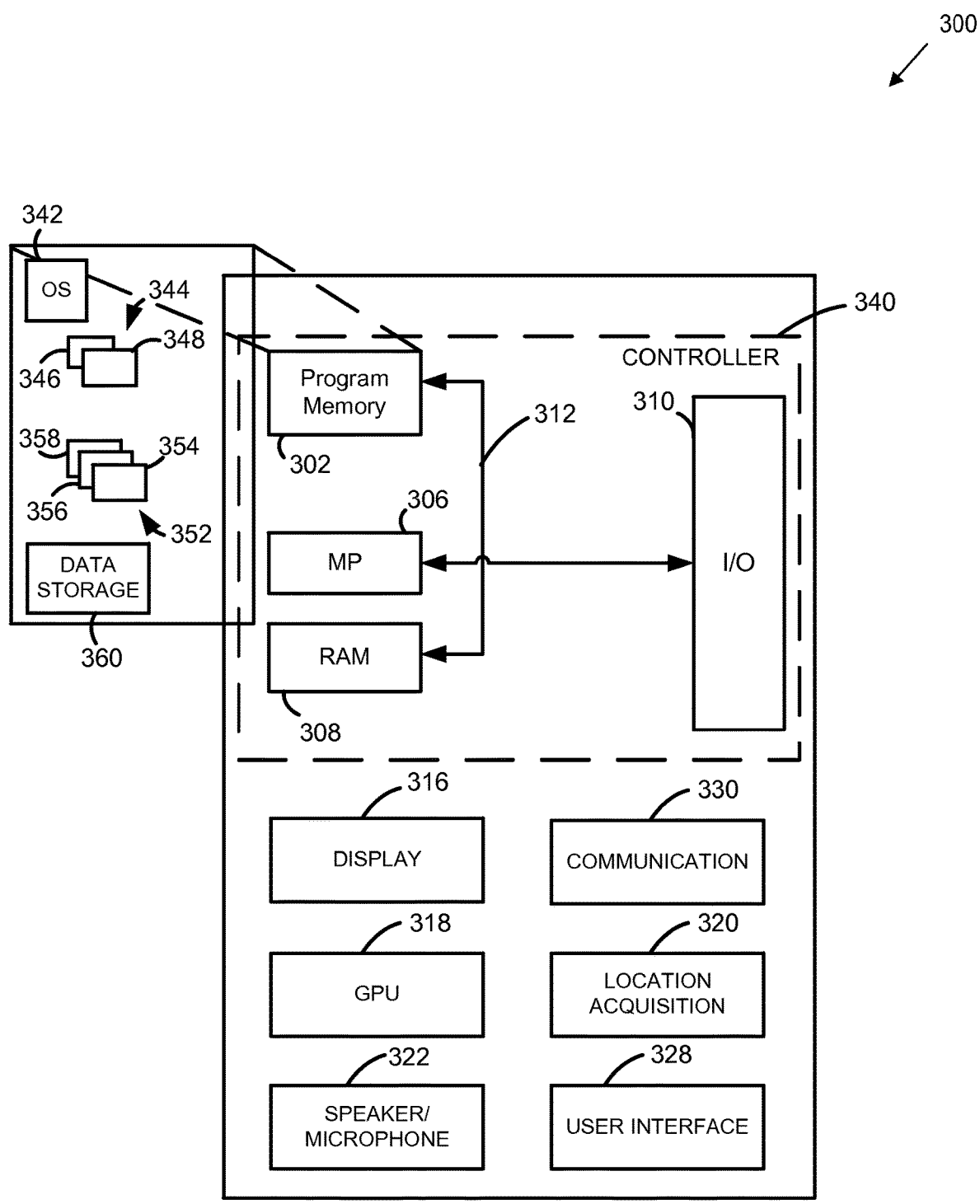
FIG. 3 illustrates an exemplary block diagram of a mobile computing device 300.

FIG. 3 illustrates an exemplary block diagram of a mobile computing device 300. Mobile computing device 300 may be implemented as any suitable computing device. In one aspect, mobile computing device 300 may be associated with a driver, passenger, witness, or other person associated with a vehicle collision or crash. In one aspect, mobile computing device 300 may be an implementation of mobile computing device 190, as shown in FIG. 1.

Mobile computing device 300 may include a controller 340, a display 316, a graphics processing unit (GPU) 318, a location acquisition unit 320, a speaker/microphone 322, a user interface 328, and a communication unit 330. Mobile computing device 300 may include additional, fewer, or alternate components, including those discussed elsewhere herein.

Controller 340 may include a program memory 302, a microprocessor (MP) 306, a random-access memory (RAM) 308, and an input/output (I/O) interface 310, each of which may be interconnected via an address/data bus 312. Controller 340 may be implemented with any suitable type and/or number of processors, such as a host processor of mobile computing device 300, for example. In some aspects, controller 340 may be configured to communicate with additional data storage mechanisms not shown in FIG. 3 for purposes of brevity (e.g., one or more hard disk drives, optical storage drives, solid state storage devices, etc.) that may reside within and/or are otherwise associated with mobile computing device 300.

Program memory 302 may store data used in conjunction with one or more functions performed by mobile computing device 300 to facilitate the interaction between mobile computing device 300 and one or more other devices (e.g., one or more of central monitoring system 150, one or more of UAVs 102.1-102.N, and/or one or more of external computing devices 160.1-160.M). For example, program memory 302 may store one or more programs, applications, algorithms, etc. that, when executed by controller 340, facilitate the interaction between mobile computing device 300 and one or more networks (e.g., communication network 170).

In various aspects, program memory 302 may be implemented as a non-transitory tangible computer readable media configured to store computer-readable instructions that, when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs 306 may be configured to execute one or more of software applications 344, software routines 352 residing in program memory 302, and/or other suitable software applications. For example, operating system 342 may be implemented as any suitable operating system platform depending upon the particular implementation of mobile computing device 300. Operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. In one aspect, data storage 360 may store data such as application data for the one or more software applications 344, routine data for the one or more software routines 352, user logon credentials, received insurance-related information, received insurance policy data, etc.

Display 316 may be implemented as any suitable type of display and may facilitate user interaction with mobile computing device 300 in conjunction with user interface 328. For example, display 316 may be implemented as a capacitive touch screen display, a resistive touch screen display, etc. In various aspects, display 316 may be configured to work in conjunction with controller 340 and/or GPU 318 to display one or more fields for user input, to display insurance pricing such as premium quotes, to display the impact of a vehicle collision or crash on the user's insurance policy, etc.

Location acquisition unit 320 may be configured to generate geographic location data utilizing any suitable global positioning techniques. For example, location acquisition unit 320 may communicate with one or more satellites and/or wireless transmitters to determine a location of mobile computing device 300. Location acquisition unit 320 may function independently or in conjunction with one or more components of mobile computing device 300. For example, location acquisition unit 320 may work in conjunction with communication unit 330 to utilize cellular location data received via communications unit 330 and implement "Assisted Global Positioning System" (A-GPS). To provide additional examples, location acquisition unit 318 may work as an independent unit implementing satellite GPS, or any other suitable global positioning protocol (e.g., the GLONASS system operated by the Russian government, the Galileo system operated by the European Union, etc.) to determine a geographic location of mobile computing device 300.

Communication unit 330 may be configured to facilitate communications between mobile computing device 300 and one or more other devices, such as central monitoring system 150, one or more of UAVs 102.1-102.N, one or more of external computing devices 160.1-160.M, etc. In various aspects, mobile computing device 300 may be configured to communicate with these other devices in accordance with any suitable number and/or type of communication protocols. Thus, in various aspects, communication unit 330 may be implemented with suitable hardware, firmware, and/or software to support any suitable number and type of communication protocols in accordance with the various aspects described herein.

Communication unit 330 may be configured to support separate or concurrent communications, which may be the same type of communication protocol or different types of communication protocols. For example, communication unit 330 may be configured to facilitate communications between mobile computing device 300 and one or more backend components (e.g., one or more of central monitoring system 150, and/or external computing devices 160.1-160.M) via a cellular communications protocol while facilitating communications between mobile computing device 300 and one or more UAVs 102.1-102.N via a personal area network communications protocol, a Wi-Fi protocol (e.g., Wi-Fi direct), etc.

Speaker/microphone 322 may be configured as one or more devices. Speaker/microphone 322 may include a microphone configured to detect sounds and to convert detected sounds to data suitable for voice recognition analysis, for storage in data storage 360, for communications via communications unit 330, etc. Speaker/microphone 322 may additionally or alternatively include a speaker configured to play sounds in response to data received from one or more components of mobile computing device 300 (e.g., controller 340 and/or communication unit 330).

User interface 328 may be implemented as any suitable device configured to collect user input, such as a "soft" keyboard displayed on display 316, a keyboard attached to mobile computing device 300, an external keyboard communicating via a wired or a wireless connection (e.g., a BLUETOOTH keyboard), an external mouse, etc.

In one aspect, software applications 344 may include an insurance claim application 346, which may be implemented as a series of machine-readable instructions for executing one or more functions described herein. In another aspect, insurance claim application 346 may cooperate with one or more other hardware or software components of mobile computing device 300 to perform these functions.

For example, insurance claim application 346 may include various instructions for facilitating reporting or otherwise communicating information to an insurer, which may be used by the insurer for various insurance-related purposes and are further discussed below with reference to FIG. 4. In one aspect, when launching insurance claim application 346, a user may enter logon credentials which may be verified by one or more external computing devices, servers, etc. (e.g., one or more of external computing devices 160.1-160.M). These logon credentials may be associated with insurer profile data, such as insurance policy numbers, vehicles insured, vehicle identification numbers of insured vehicles, contact information, premium rates, discounts, etc. In this way, communications from mobile computing device 300 allow central monitoring system 150 and/or one or more of external computing devices 160.1-160.M to uniquely identify the insured customer so that any collected data, via mobile computing device 300 and/or via one or more UAVs 102.1-102.N, may be saved and later referenced to the insurance customer and any insurance policies associated with that customer.

For example, insurance claim application 346 may facilitate the determination of a geographic location of mobile computing device 300 (e.g., via communications with location acquisition unit 320) and communicate this information to one or more of central monitoring system 150, one or more of UAVs 102.1-102.N, and/or one or more of external computing devices 160.1-160.M. To provide additional examples, insurance claim application 346 may facilitate instructions and/or prompts being displayed via display 316 guiding a user to collect data associated with a vehicle collision or crash (e.g., images of vehicles, driver's licenses, interview answers, etc.).

To provide an additional example, insurance claim application 346 may facilitate a user requesting one or more UAVs 102.1-102.N to the scene of the vehicle collision or crash, which may be specified, for example, by the geographic location of mobile computing device 300. In accordance with various embodiments, a user may utilize mobile computing device 300 to request one or more of UAVs 102.1-102.N via communications with a UAV 102.1-102.N, by sending a request to one or more of central monitoring system 150, and/or by sending a request to one or more of external computing devices 160.1-160.M. One or more of central monitoring system 150 and/or one or more of external computing devices 160.1-160.M may process these requests manually, automatically, or semi-automatically to dispatch one or more UAVs 102.1-102.N to the requested scene of the vehicle collision or crash.

In some aspects, insurance claim application 346 may facilitate communications with one or more of central monitoring system 150, one or more of UAVs 102.1-102.N, and/or one or more of external computing devices 160.1-160.M to receive an estimated time in which one or more UAVs 102.1-102.N may arrive at the scene of the vehicle collision or crash, which may be relayed to a user using any suitable techniques (e.g., via display 316).

Software applications 344 may include a web browser 348. In some aspects, web browser 348 may be a native web browser application, such as Apple's Safari®, Google Android™ mobile web browser, Microsoft Internet Explorer® for Mobile, Opera Mobile™, etc. In other embodiments, web browser 348 may be implemented as an embedded web browser. Regardless of the implementation of web browser 348, various aspects include web browser 348 being implemented as a series of machine-readable instructions for interpreting and displaying web page information received from one or more backend components. This web page information may be utilized in conjunction with insurance claim application 346 to perform one or more function of the aspects as described herein.

In one embodiment, software routines 352 may include a data collection routine 354, a UAV request routine 356, and/or a feedback routine 358. Data collection routine 354 may include instructions, that when executed by controller 340, facilitate the collection of audio, video, and/or image data associated with a vehicle collision or crash.

For example, data collection routine 354 may include instructions that, when executed by controller 340 in conjunction with insurance claim application 346, present a user with instructions and/or prompts to collect images, video, answer one or more predetermined interview questions prepared by an insurer, collect insurance claim form field data entered by a user, etc. In one aspect, data collection routine 354 may include instructions that, when executed by controller 340 in conjunction with insurance claim application 346, store the collected data as one or more data files in data storage 360 and/or cause the collected data to be transmitted via communication unit 330 to one or more external computing devices 160.1-160.M. External computing devices 160.1-160.M may use this data in addition to or as an alternative to the collected drone data to generate accident reconstruction and/or to perform various insurance-related tasks, which are further discussed below with reference to FIG. 4.

UAV request routine 356 may include instructions, that when executed by controller 340, facilitate the dispatching of one or more UAVs 102.1-102.N to a location specified by a user, which may be the scene of a vehicle collision or crash, for example. In one aspect, UAV request routine 356 may include instructions that, when executed by controller 340 in conjunction with insurance claim application 346, display one or more options to a user to request one or more UAVs 102.1-102.N, to determine and/or transmit the requested UAV delivery location, and/or to transmit the request via communication unit 330.

Feedback routine 358 may include instructions, that when executed by controller 340, supports user interaction with mobile computing device 300. For example, controller 340 may execute instructions stored in feedback routine 358 to obtain information from a user and/or to provide the user with information received from one or more of UAVs 102.1-102.N, central monitoring system 150, and/or one or more of external computing devices 160.1-160.M. To provide another example, controller 340 may execute instructions stored in feedback routine 358 to display one or more prompts, to view insurance-related data such as insurer profile data, to view updates and/or the status of pending claims, to view updated insurance-related data such as new calculated insurance premiums, a calculated fault allocation, the status of an insurance claim process, the impact of a vehicle collision or crash on a user's insurance policy data, etc.

Although each of the components in FIG. 3 are illustrated as separate units or modules, any components integrated as part of mobile computing device 300 may be combined and/or share functions. For example, controller 340, GPU 318, and program memory 302 may be integrated as a single processing unit. Furthermore, although connections are not shown between the individual components of mobile computing device 300, mobile computing device 300 may implement any suitable number of wired and/or wireless links to facilitate communication and interoperability between these components.

For example, program memory 302, communication unit 330, and/or display 316 may be coupled via wired buses and/or wireless links to controller 340 and/or GPU 318 to facilitate communications between these components and/or to enable these components to accomplish their respective functions as described throughout the present disclosure. Furthermore, although FIG. 3 illustrates mobile computing device 300 having a single program memory 302, mobile computing device 300 may implement any suitable number and/or combination of memory systems.

Additionally, although FIG. 3 depicts controller 340 as including one program memory 302, one MP 306, and one RAM 308, controller 340 may include any suitable number of these components. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

IV. Exemplary External Computing Device

Figure 4:
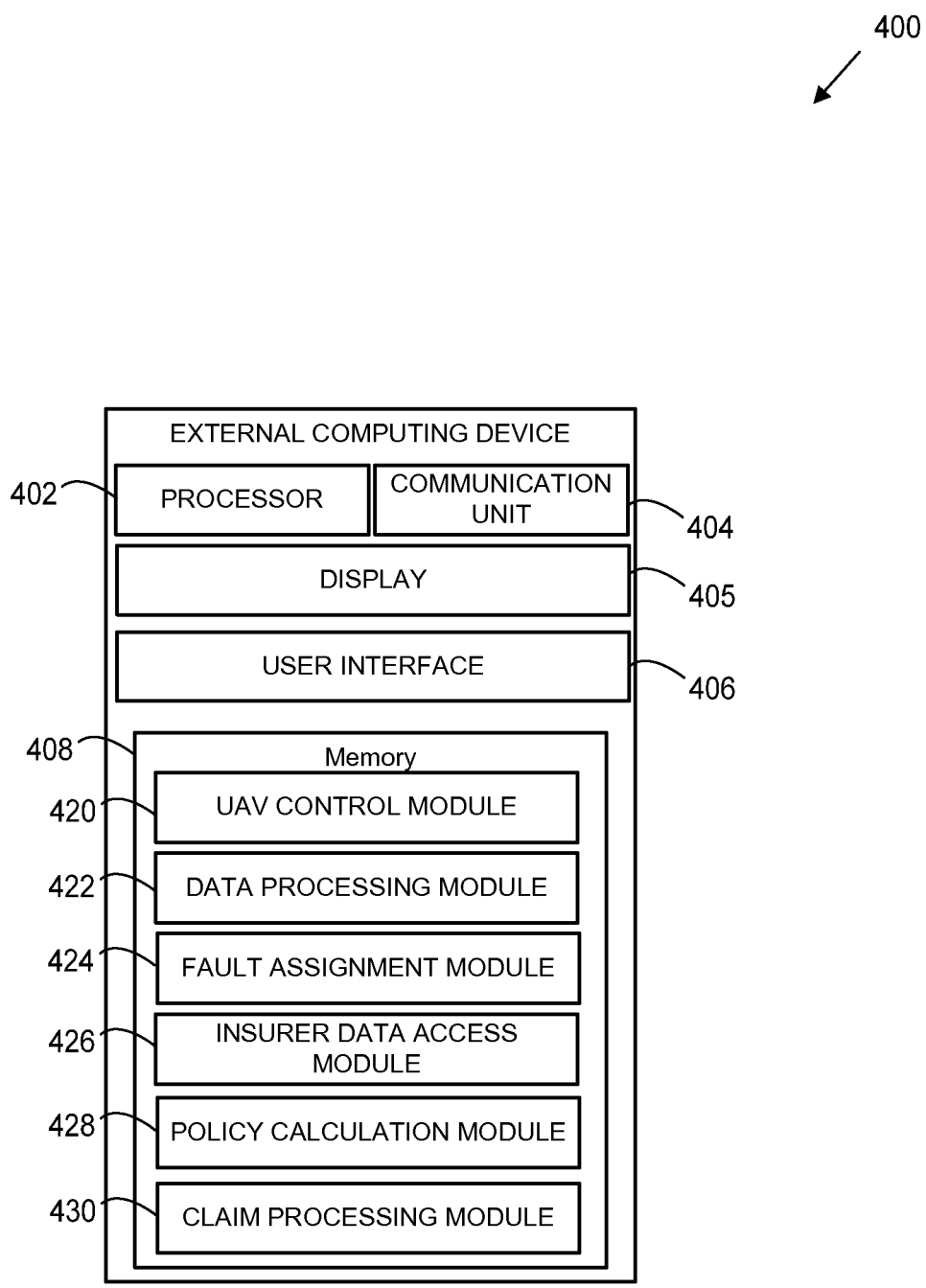
FIG. 4 illustrates an exemplary block diagram of an external computing device 400.

FIG. 4 illustrates an exemplary block diagram of an external computing device 400. External computing device 400 may be implemented as any suitable computing device. In various aspects, external computing device 400 may be an implementation of central monitoring system 150 or one or more of external computing devices 160.1-160.M, as shown in FIG. 1. External computing device 400 may include a processor 402, a communication unit 404, a display 405, a user interface 406, and a memory 408. External computing device 400 may include additional, fewer, or alternate components, including those discussed elsewhere herein.

Processor 402 may be implemented as any suitable type and/or number of processors, such as a host processor of external computing device 400, for example. To provide additional examples, processor 402 may be implemented as an application specific integrated circuit (ASIC), an embedded processor, a central processing unit (CPU) associated with external computing device 400, a graphical processing unit (GPU), etc.

Processor 402 may be configured to communicate with one or more of communication unit 404, display 405, user interface 406, and/or memory 408 via one or more wired and/or wireless interconnections, such as any suitable number of data and/or address buses, for example. These interconnections are not shown in FIG. 4 for purposes of brevity.

Processor 402 may be configured to operate in conjunction with one or more of communication unit 404, display 405, user interface 406, and/or memory 408 to process and/or analyze data, to store data to memory 408, to retrieve data from memory 408, and/or to perform one or more insurance-related functions. For example, processor 402 and communication unit 404 may facilitate receiving data from and/or sending data to one or more devices, such as central monitoring system 150, mobile computing device 200, one or more UAVs 102.1-102.N, etc.

Communication unit 404 may be configured to facilitate communications between external computing device 400 and one or more other devices. For example, in aspects in which external computing device 400 is an implementation of one or more of external computing devices 160.1-160.M, as shown in FIG. 1, communication unit 404 may facilitate communications between external computing device 400 and one or more UAVs 102.1-102.N, mobile computing device 190, and/or central monitoring system 150.

In various aspects, external computing device 400 may be configured to communicate with these other devices in accordance with any suitable number and type of communication protocols. Thus, in various aspects, communication unit 404 may be implemented with suitable hardware, firmware, and/or software to support any suitable number and type of communication protocols in accordance with the various aspects described herein.

Display 405 may be implemented as any suitable type of display and may facilitate user interaction with external computing device 400 in conjunction with user interface 406. For example, display 405 may be implemented as a capacitive touch screen display, a resistive touch screen display, etc. In various aspects, display 405 may be configured to work in conjunction with processor 402 and/or user interface 406 to display drone data received from one or more UAVs, to display data received from one or more mobile computing devices (e.g., requests for UAVs to be sent to the scene of a vehicle collision or crash), to display the result of various insurance-related calculations, to display the location of one or more UAV's, to display insurance profile data and/or other information associated with an insured person, to provide a graphical user interface (GUI) to facilitate the control and/or monitoring of one or more UAVs, etc.

User-interface 406 may be implemented as any suitable device configured to collect user input, such as a "soft" keyboard displayed on display 405, a keyboard attached to external computing device 400, an external keyboard communicating via a wired or a wireless connection (e.g., a BLUETOOTH keyboard), specialized joystick controls configured to control one or more UAVs, an external mouse, etc.

In various aspects, memory 408 may be implemented as a non-transitory tangible computer readable media configured to store computer-readable instructions, that when executed by processor 402, cause processor 402 to perform various acts. Program memory 408 may store one or more modules, which may be executed by processor 402 in conjunction with one or more other hardware or software components of external computing device 400 to facilitate the execution of one or more functions related to the various aspects, as further discussed below.

UAV control module 420 may include instructions to facilitate monitoring and/or controlling of one or more UAVs, such as UAVs 102.1-102.N, for example, as shown in FIG. 1. UAV control module may include instructions that, when executed by processor 402, enables processor 402 to process data sent by one or more UAVs, to identify one or more UAVs, to determine a status of one or more UAVs, and/or to transmit commands to one or more UAVs.

For example, processor 402 may receive periodic transmissions sent by one or more UAVs, and these transmissions may include a unique UAV identifier, a current geographic location of each UAV, a UAV status (e.g., en route to location, collecting data, charging and/or refueling, etc.), and/or a confirmation of receipt of a command sent to one or more UAVs. In some aspects, processor 402 may use this information to command one or more UAVs to navigate to a specific geographic location or to return to a predetermined "base" location, which may be used for refueling, recharging, and/or maintenance, for example.

In some aspects, a user may interact with external computing device 400 to perform control over one or more UAVs by, for example, watching video data and/or geographic location data received from one or more UAVs shown on display 405 and sending commands to one or more UAVs using this feedback. Information shown on display 405 for UAV control may include, for example, live video data, a map overlaid onto the UAV's current geographic location, etc.

In accordance with such aspects, processor 402 may execute instructions stored in UAV 402 to process controls received via user interface 406 (e.g., adjustments to altitude, speed, yaw, pitch, roll, direction, etc.), and convert these controls to data that is sent in a UAV control transmission, which may be transmitted via communication unit 404, for example.

When controlled by a user, external computing device 400 may function as a UAV dispatching center, receiving instructions to dispatch one or more UAVs and then navigating the one or more UAVs to the requested geographic locations, which may include the scene of a vehicle collision or crash. For example, personnel trained to control UAVs may monitor communications received via communication unit 404, which may be forwarded from a call center (e.g., from a person involved in the vehicle collision or crash), received as a request sent via a mobile computing device, etc.

In other aspects, one or more UAVs may be controlled without (or with minimal) user intervention. In accordance with such aspects, external computing device 400 may function as a UAV dispatching center, but a person may not need to manually control one or more UAVs. For example, UAV requests may be received by external computing device 400 in an automated fashion, such as requests sent via a mobile computing device or via another Internet-enabled device, for example. In accordance with such aspects, these requests may include the geographic location of a requested UAV destination and/or details regarding the type of data to be collected upon the UAV reaching the destination.

In accordance with such aspects, processor 402 may execute instructions stored in UAV control module 420 to process these requests, determine a navigation route for one or more UAVs, and transmit the appropriate commands to one or more UAVs to ensure the UAV arrives at the requested geographic location. In various aspects, processor 402 may utilize live video data received from a UAV, weather conditions, and/or any other suitable data to safely guide the UAV to the requested location.

For example, processor 402 may execute instructions stored in UAV control module 420 analyze live video data received from a UAV in accordance with any suitable image recognition, object recognition, and/or machine vision algorithms to guide the UAV to a specific geographic location with little or no user intervention.

In some aspects, a UAV may be dispatched after a vehicle collision or crash has occurred, such as by one or more persons involved in the vehicle collision or crash using a mobile computing device, for example. But in other aspects, one or more UAVs may actively survey area to collect data prior to an vehicle collision or crash, and save and/or transmit this data as needed. These aspects may be particularly useful when specific intersections or other areas are associated with a high number of vehicle collision or crash, such that one or more UAVs may monitor these areas in shifts to collect data at all times throughout the day, during rush hour, etc. The one or more UAVs may store collected drone data in a rolling buffer, periodically transmit collected drone data to an external computing device, etc.

Regardless of how external computing device 400 controls one or more UAVs, aspects include processor 402 executing instructions stored in UAV control module 420 to send one or more commands to one or more UAVs which, upon receiving by the commands, execute them to collect various types of data. For example, processor 402 may execute instructions stored in UAV 402 to send data in a UAV control transmission, which may be transmitted via communication unit 404, for example. This data may indicate specific commands which may be manually sent by a user and/or automatically sent upon a particular condition being satisfied, for example (e.g., the UAV arriving within a threshold distance of the destination).

The data collection commands may include any suitable command for the collection of drone data, such as recording audio and/or video of the scene of a vehicle collision or crash, playing a prerecorded message requesting information from one or more persons associated with the vehicle collision or crash, initiating a video conference call between one or more persons associated with the scene of the vehicle collision or crash and an operator of external computing device 400, requesting the weather conditions at the scene of the vehicle collision or crash, requesting the temperature at the scene of a vehicle collision or crash, etc.

Data processing module 422 may include instructions to facilitate the collection of drone data from one or more UAVs, such as UAVs 102.1-102.N, for example, as shown in FIG. 1. Additionally or alternatively, data processing module 422 may include instructions to facilitate the collection of other sources of data, such as data received via one or more mobile computing devices, for example.

Data processing module 420 may include instructions that, when executed by processor 402, enable processor 402 to process drone data sent by one or more UAVs, to store the drone data in memory 408 and/or another suitable storage device (e.g., one or more databases in which external computing device 400 is connected), and/or to transmit the drone data to one or more other external computing devices.

For example, once a UAV is dispatched to the scene of a vehicle collision or crash, the UAV may proceed to collect drone data, as previously discussed above with reference to the instructions stored in UAV control module 420. In various aspects, processor 402 may execute instructions stored in data processing module 422 to receive this data from the one or more UAVs, to parse the data, and/or to correlate the data so that specific drone data may be later identified and associated with the particular type of data to which it corresponds.

To provide an illustrative example, processor 402 may execute instructions stored in data processing module 422 to receive live video and/or audio data recorded by a UAV, which may include various types of information used to assess the fault of various parties or vehicles involved in a vehicle collision or crash. In one aspect, this video may be timestamped by the UAV and/or by external computing device 400 to indicate when each command was sent and/or when each different type of data was recorded.

In this way, external computing device 400 may receive the data, parse the data, reference the timestamps to the commands sent, and label and/or store the parsed collected drone data in a way such that it may be easily identified. For example, drone data may include several interviews of different people, police officers, etc., along with several images of the scene of the vehicle collision or crash. Aspects include processor 402 executing instructions stored in data processing module 422 to separate these videos and store them with a suitable header, filename, label, etc., so that this data can be easily identified, accessed, read, viewed, processed, etc.

Fault assignment module 424 may include instructions to facilitate the calculation of fault allocation for a vehicle collision or crash using data collected from one or more UAVs, such as UAVs 102.1-102.N, for example, as shown in FIG. 1. Fault assignment module 424 may include instructions that, when executed by processor 402, enable processor 402 to allocate fault in accordance with any suitable number and type of fault allocation algorithms, calculations, manual review, etc., to store fault allocation data indicative of the fault allocation determination in memory 408 and/or another suitable storage device (e.g., one or more databases in which external computing device 400 is connected), and/or to transmit the fault allocation data to one or more other external computing devices.

In one aspect, the percentage fault allocated to various drivers (or the vehicles) may be determined through an analysis of the collected drone data that matches various parameters included in a fault allocation profile. The fault allocation profile may include various parameters that are combined and/or weighed to calculate a fault allocation for each driver. These parameters may include, for example, the location of vehicle damage, weather conditions, road conditions, the presence of road construction, traffic light patterns, ranges of telematics data metrics corresponding to various vehicle speeds, acceleration, braking, etc.

For example, in some aspects, the drone data associated with the scene of a vehicle collision or crash may be subject to manual review. In accordance with such aspects, insurance claims personnel may review the drone data to determine a fault allocation (e.g., a percentage fault from a total of 100%) for each driver involved. To provide an illustrative example, insurance claims personnel may review answers to interview questions and/or prompts recorded by one or more UAVs, which may be recorded video and/or audio data, for example. These answers may be analyzed to determine whether the information is consistent across multiple sources, which may include police officers at the scene of the vehicle collision or crash, witnesses, drivers, passengers, etc. If information is corroborated in this manner and the answers lead to the conclusion that one party is wholly responsible for the vehicle collision or crash (e.g., one driver ran a red light or stop sign) then aspects include the personnel allocating 100% fault to that party accordingly. These aspects may additionally or alternatively include any traditional claim processing techniques used to determine fault allocation with the utilization of the collected drone data.

In other aspects, the drone data associated with the scene of a vehicle collision or crash may be analyzed in an automatic or semi-automatic manner to calculate fault allocation using the fault allocation profiles. To provide an illustrative example, a UAV may be dispatched to the scene of vehicle collision or crash after the vehicle collision or crash occurs and collect several images of the vehicles involved as drone data. A person and/or machine-vision algorithm may analyze these images to determine where each vehicle was damaged. Once these locations are known, processor 402 may execute instructions stored in fault assignment module 424 to determine that a first vehicle is damaged on the passenger side, while the front of a second vehicle is also damaged. Live video data of the scene of the vehicle collision or crash may also show that the vehicle collision or crash was not near a traffic light or stop sign, the weather conditions at the time of the vehicle collision or crash provided good visibility, and the road conditions were dry. In such a scenario, the data collected provides good evidence that the second vehicle likely pulled out into the first vehicle without paying attention, and 100% fault may be allocated to the driver of the second vehicle.

To provide another illustrative example, collected drone data for another vehicle collision or crash scene may show damage to the front of a first vehicle and the driver's side of a second vehicle. In such a case, the fault could initially be allocated to either driver equally (e.g., 50% each). But a further analysis of the images and/or video data may also show that the damage to the front of the first vehicle is positioned to the left front corner or left front side, providing evidence that the first vehicle attempted to swerve to the right to avoid the second vehicle. In such a scenario, the data collected provides good evidence that the second vehicle likely pulled out in front of the first vehicle, causing the first vehicle to swerve, and 100% fault may be allocated to the driver of the second vehicle.

To provide a further illustrative example, collected drone data for another vehicle collision or crash scene may include telematics data collected from one or more vehicles. This telematics data may indicate metrics measured by one or more vehicle onboard computers (or a mobile computing device located in the vehicle), and may indicate the conditions during the vehicle collision or crash such as, for example, the vehicle speed, direction, acceleration, braking, etc. The telematics data may indicate, for example, that a first vehicle swerved while a second vehicle only slowed just prior to impact (which may be indicated in the telematics data, for example, by a sudden deceleration). In this scenario, the collected telematics data provides good evidence that the second vehicle likely pulled out in front of the first vehicle, and 100% fault may be allocated to the driver of the second vehicle.

To provide yet another illustrative example, collected drone data for another vehicle collision or crash scene may indicate that the scene of the vehicle collision or crash includes an intersection with a traffic light. The collected images and/or video data may show damage to the front of a first vehicle and the driver's side of the second vehicle. In such a scenario, the data collected provides good evidence that the first vehicle likely ran the traffic light and collided broadside with the second vehicle, and 100% fault may be allocated to the driver of the first vehicle.

The previous illustrative examples utilize drone data collected after a vehicle collision or crash has occurred. However, aspects also include the use of surveillance data collected by one or more UAVs monitoring an area in which a vehicle collision or crash then occurs. In accordance with such aspects, processor 402 may execute instructions stored in data processing module 422 to identify the geographic location and/or time of the vehicle collision or crash, and locate the relevant drone data so the details of the vehicle collision or crash may be analyzed. In accordance with such aspects, processor 402 may execute instructions stored in fault assignment module 424 to allocate, using the collected drone data for the vehicle collision or crash, fault to each driver involved in the vehicle collision or crash. Again, this fault allocation process may be performed via manual review of the collected drone data (e.g., personnel viewing video data and seeing a vehicle run a red light), an automatic process, or a semi-automatic process (e.g., object recognition may identify a vehicle running a red light, flag the vehicle for further manual review, determining a license plate number corresponding to a vehicle and allocating 100% fault to that vehicle, etc.).

Insurer data access module 426 may include instructions to facilitate external computing device 400 accessing, reading, storing, and/or updating insurer data. For example, an insurer may store insurance policy data associated with vehicles and/or persons insured, their policy information, policy numbers, profile data, current premium process, the name of persons insured and their contact information, vehicles insured, license plate numbers, registration information, a history of vehicle collisions or crashes and/or citations, vehicle identification numbers of insured vehicles, discounts in which insured customers may be qualified for and/or currently taking advantage of, current open claims, a history of vehicle collisions or crashes and/or previous claims, etc. This insurance policy data may be stored across several external computing devices, on one or more databases and/or storage devices, etc.

In one aspect, processor 402 may execute instructions stored in insurer data access module 426 to facilitate accessing this data and/or manipulating this data. For example, an insured customer may report a vehicle collision or crash using her logon credentials, which may be used by external computing device 400 to access the insurer data for the insured customer in a secure manner. As drone data is collected, processor 402 may associate the collected drone data and/or an allocation of fault for the insured customer with her insurance policy data on file, appending, storing, or otherwise referencing the collected drone data and/or fault allocation to the insured customer's insurance data.

In various aspects, some portions of the insurance data may be secured by the insurer as proprietary information, while other aspects of the insurance data may be made available to authorized users via the Internet (e.g., those providing the correct login credentials). Processor 402 may execute instructions stored in insurer data access module 426 to allow parties access to insurance data in accordance with the appropriate level of access established by the insurer.

Policy calculation module 428 may include instructions to facilitate external computing device 400 calculating pricing related to one or more insurance policies based upon the percentage of fault assigned to the driver of the insured vehicle. For example, an insurer may calculate insurance pricing based upon a number of citations, whether the driver's license has been suspended, etc., any of which may be revealed as part of the drone data collection process discussed herein.

In some instances, the pricing may not be changed unless the driver is allocated some threshold percentage of fault (e.g., 50%). These aspects may be particularly useful, for example, when the insurer uses an accident forgiveness policy that does not raise the premium rates for an insured customer when the driver is not found to be at fault for a vehicle collision or crash.

In one aspect, processor 402 may execute instructions stored in policy calculation module 428 to reassess and/or recalculate pricing related to one or more insurance policies based upon the percentage of fault assigned to the driver of the insured vehicle. This may include, for example, increasing premiums when the allocated fault is greater than 50%, disqualifying an insured customer from one or more discounts related to safe driving, etc. Policy calculation module 428 may include instructions to facilitate the calculation of insurance pricing using any suitable techniques, which may include traditional techniques that utilize the collected drone data.

In one aspect, processor 402 may execute instructions stored in insurer data access module 426 to update the insurance data with an updated insurance pricing. Further in accordance with such aspects, processor 402 may execute instructions stored in policy calculation module 428 to cause external computing device 400 to transmit the updated insurance pricing to a mobile computing device (e.g., to mobile computing device 200 via communication unit 404). The mobile computing device, upon receiving the updated insurance pricing data, may display the updated insurance pricing data related to the user's insurance policy. In this way, an insurance customer may receive updates regarding the impact of a vehicle collision or crash for which drone data was collected on the insured customer's premiums, a loss of discounts, etc.

Claim processing module 430 may include instructions to facilitate external computing device 400 processing an insurance claim based upon the percentage of fault assigned to the driver of the insured vehicle and/or the collected drone data. In various aspects, processor 402 may execute instructions stored in claim processing module 430 to facilitate manual, automatic, or semi-automatic claim processing.

For example, claim processing module 430 may include instructions that, when executed by processor 402, cause display 405 to display various prompts, form data, instructions, etc., used in conjunction with the submission of an insurance claim. In accordance with such aspects, insurer personnel may complete any suitable portions of the requested data using the drone data and/or allocated fault calculated for a particular insured party. The claim process may include the entry of data such as, for example, insurance policy numbers, the identification of the insured, the identification of license plate information, the parties involved in the vehicle collision or crash, the details regarding when the vehicle collision or crash occurred, the geographic location and/or vehicle collision or crash, the fault assigned to one or more parties involved in the vehicle collision or crash, weather conditions, road conditions, whether there was road construction at the time of the vehicle collision or crash or other factors potentially distracting the drivers, etc.

Thus, in accordance with aspects in which manual entry is utilized, insurer personnel may use external computing device 400 (e.g., via user interface 406) to complete one or more forms used by the insurer to submit an insurance claim. To complete such a form, the person may retrieve insurance data for the insured and enter various form fields using the collected drone data and/or the fault allocation. In this way, the drone data and/or fault allocation may assist insurer personnel throughout the claim submission process.

To provide another example, claim processing module 430 may include instructions that, when executed by processor 402, cause the insurance claim form data to be automatically populated based upon any suitable combination of the collected drone data and/or the fault allocation. For example, processor 402 may execute instructions stored in data processing module 422 to perform optical character recognition (OCR) on one or more images of a vehicle license plate that was received as part of collected drone data, and to extract a character string as the license plate number for that vehicle. This string may then be used to fill in form data that would otherwise need to be manually entered.

To provide another example, insurance claim form data may collect other information such as, for example, the location of damage on a vehicle, the geographic location of the vehicle collision or crash, an explanation of what happened, any injuries, etc. This information may be extracted from the collected drone data as extracted OCR data, as text resulting from a speech-to-text analysis of recorded interview audio, etc., and used to populate the respective data fields of an insurance claim form, which is then utilized by the insurer to submit an insurance claim.

In one aspect, once the claim form data is entered either manually, semi-automatically, or automatically, the data may be submitted to other departments and/or processed by external computing device 400 to start the claim process. The submission of the claim form data may include, for example, transmitting the data via communication unit 404 to another external computing device, which may be associated with a particular insurance department within an insurance company, for example. The insurance department may perform a claim process utilizing the insurance claim form data to determine whether a payout is applicable for a submitted claim, and issue payment accordingly.

The aforementioned aspects discuss the determination of fault allocation for vehicle collision or crashes for vehicles being driven by a person. However, aspects also include similar processes being applied to determine a malfunction associated with autonomous or semi-autonomous vehicles, and thus the allocation of fault to such malfunctioning vehicles.

V. Exemplary Method of Utilizing Drone Data

Figure 5:
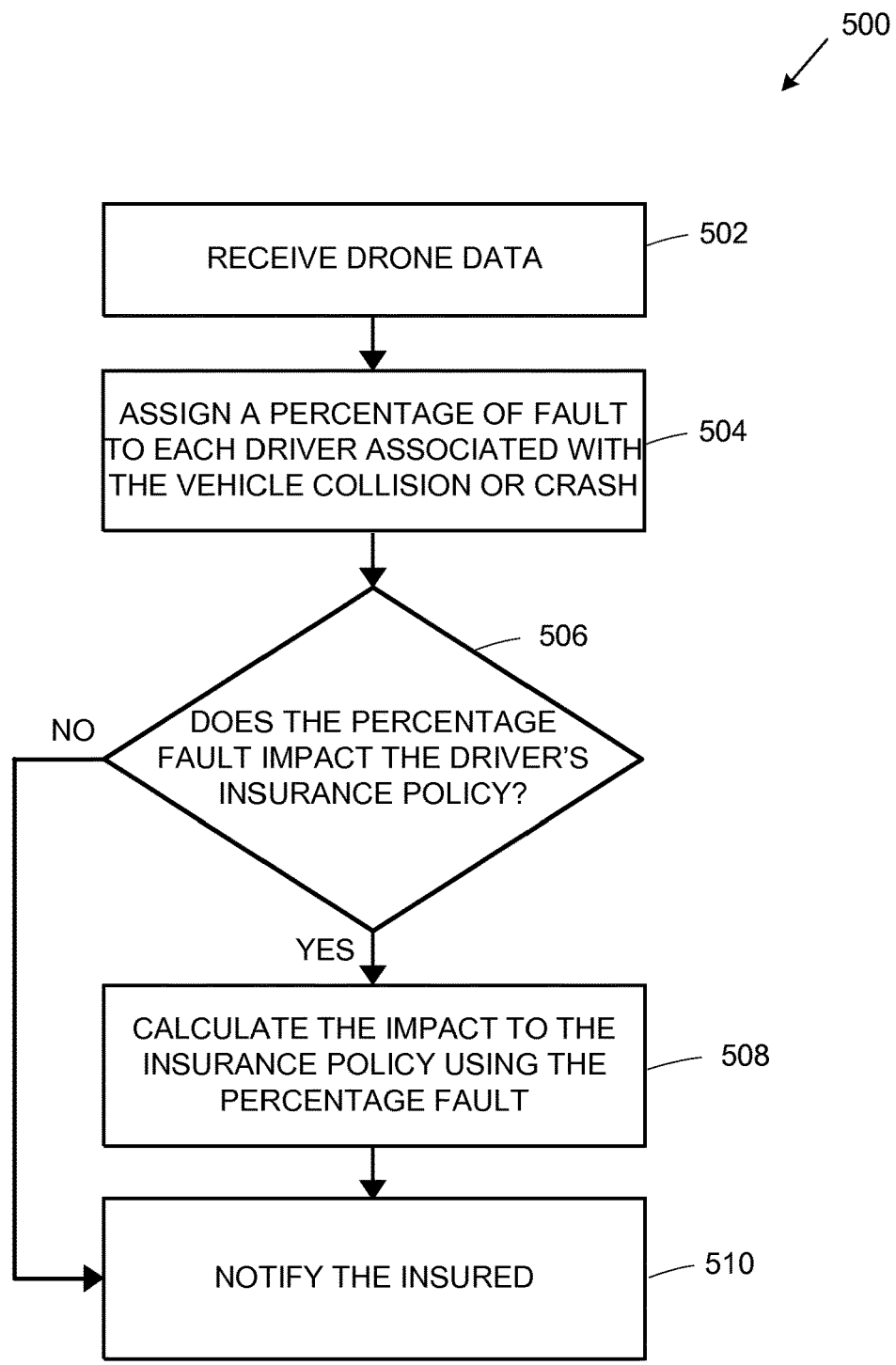
FIG. 5 illustrates an exemplary computer-implemented method 500.

FIG. 5 illustrates an exemplary computer-implemented method 500. In the present aspect, method 500 may be implemented by any suitable computing device (e.g., central monitoring system 150 and/or one or more of external computing devices 160.1-160.M, as shown in FIG. 1). In the present aspect, method 500 may be performed by one or more processors, applications, and/or routines, such as processor 402 executing instructions in one or more modules stored in non-transitory memory 408, for example, as shown in FIG. 4.

Method 500 may start when one or more processors receive drone data corresponding to a vehicular collision or crash (block 502). This may include, for example, receiving drone data collected from one or more UAVs dispatched to the scene of a vehicle collision or crash (block 502). The drone data may include, for example, images, video, audio, interview responses from persons associated with the vehicle collision or crash, weather data, aerial video footage, etc. (block 502).

Method 500 may include one or more processors assigning a percentage of fault to each driver associated with, and/or each vehicle (such as an autonomous or semi-autonomous vehicle) involved in, the vehicle collision or crash (block 504). This may include, for example, an analysis of the collected drone data to determine whether one or more parameters are matched to those of a fault allocation profile, as previously discussed with reference to FIG. 4 (block 504).

Method 500 may include one or more processors determining whether the percentage fault assigned to a particular driver (block 504) will impact driver's insurance policy (block 506). This may include, for example, determining whether a discount is lost or a premium price will be increased to reflect additional future risk (block 506). If so, then method 500 may continue to calculate the impact to the insurance policy using the percentage allocated fault (block 508). If not, then method 500 may continue to notify the insured that the insurance policy pricing, discounts, etc., will remain unchanged as a result of the vehicle collision or crash (block 510).

Method 500 may include one or more processors calculating the impact to the insurance policy using the percentage allocated fault (block 508). This may include, for example, performing a calculation using any suitable algorithm to assess the new risk of the insured party and to update the premium pricing accordingly (block 508). This may additionally or alternatively include, for example, determining whether a discount has been lost by the driver as a result of the vehicle collision or crash (block 508).

Method 500 may include one or more processors notifying the insured of the result of the impact to the insurance policy as a result of the vehicle collision or crash (block 510). This may include, for example, an indication of updated premium pricing, lost discounts, etc. (block 510). This may also include, for example, that pricing, discounts, etc., will remain unchanged as a result of the vehicle collision or crash (block 510). The notification may be performed using any suitable techniques, such as sending an email, a text message, a push notification, etc. (block 510). This may alternatively or additionally include, for example, sending the notification to the insured driver's mobile computing device, which displays the notification and/or the updated insurance policy data (block 510).

VI. Additional Technical Advantages

In the various aspects described herein, UAV 200, mobile computing device 300, and/or external computing device 400 may facilitate dispatching one or more UAVs to a vehicle collision or crash, receiving collected drone data, allocating fault to one or more vehicles and/or drivers using the collected drone data, and/or the submission of an insurance claim. Additionally or alternatively, these aspects may provide other benefits relating to the technical operation of UAV 200, mobile computing device 300, external computing device 400, and/or the storage devices associated therewith.

For example, external computing device 400 may advantageously perform object recognition and/or OCR processes on image and/or video data to populate insurance form field data. Thus, in accordance with such aspects, external computing device 400 may perform more efficiently by eliminating user error and decreasing the chances that claim form data will need to be resubmitted.

Furthermore, external computing device 400 may also provide benefits such as decreased network bandwidth, as less communication is required between the insurers and policy holders due to the increased chance of the submitted claim forms providing the correct information. And due to the increased efficiency, external computing device 400 may also save power that would otherwise be utilized for the transmission and/or reception of additional insurance claim form processing.

One or more UAVs may also be dispatched to the scene of a vehicle collision or crash to collect drone data in an autonomous or semi-autonomous fashion. In traditional insurance claim processing, a claims adjuster would ordinarily need to assess vehicle damage and allocate fault based upon the data available, which may include police reports, the location of the vehicle damage, etc. Using the collected drone data, the time-consuming process of manual claim adjustment may be largely or entirely eliminated. Therefore, the present aspects increase the speed and efficiency in which insurance claims may be processed.

VII. Exemplary Method of Determining Vehicle Collision or Crash Fault Allocation for Drivers and Vehicles In one aspect, a computer-implemented method of vehicle collision or crash fault determination using drone data may be provided. The method may include (1) receiving image, audio, and/or other drone data, at or via a remote server (and/or one or more remote processors) associated with an insurance provider, from one or more drones (or drone transceivers) via wireless communication or data transmission, the drone data received recording, showing, capturing, detailing, or otherwise being associated with a scene of a vehicle collision or crash and being generated, collected, captured, or gathered by the one or more drones (and/or associated drone sensors, cameras, imaging devices, audio or visual recording devices, and/or other drone-mounted electronic devices) before, during, and/or after the vehicle collision or crash, the vehicle collision or crash involving an insured driver or vehicle covered by an insurance policy issued by the insurance provider; (2) analyzing, at or via the remote server, the drone data received; (3) assigning, at or via the remote server, a percentage of fault to each driver or vehicle (including smart or autonomous vehicles) involved in the vehicle collision or crash, including the insured driver or vehicle, based upon the analysis of the drone data; and/or (4) adjusting or updating, at or via the remote server, a premium, rate, reward, or discount for the insurance policy of the insured driver or vehicle based upon the percentage of fault of the vehicle collision or crash that is assigned to the insured driver or vehicle from computer analysis of the drone data. The method may include additional, fewer, or alternate actions, including those discussed elsewhere herein.

For instance, the method may further include generating a wireless communication, at or via the remote server, related to the adjusted or updated insurance policy; and/or transmitting the wireless communication from the remote server to a mobile device of the insured driver or a smart vehicle controller for presentation of the adjusted or updated insurance policy to the insured driver or an owner of the insured vehicle. The method may further include generating, at or via the remote server, an estimated insurance claim for the insured driver or vehicle based upon the analysis of the drone data; and/or transmitting the estimated insurance claim from the remote server to a computing device to facilitate review, approval, and/or modification of the estimated insurance claim by the insured driver or an owner of the insured vehicle.

The drone data may be used to determine a percentage of fault for (1) human drivers; (2) autonomous or semi-autonomous vehicles; (3) road conditions; (4) traffic conditions; (5) weather conditions; and/or (6) road construction. The drone data showing (or otherwise associated with) the scene of the vehicle collision or crash before, during, and/or after the vehicle collision or crash may be used to reconstruct a series of events leading up to the vehicle collision or crash and build a virtual simulation of the vehicle collision or crash that shows each vehicle involved, as well as their respective direction of travel and/or speed before, during, and/or after the vehicle collision or crash.

VIII. Exemplary Method of Determining Vehicle Collision or Crash Fault Allocation for Autonomous or Semi-Autonomous Vehicles In another aspect, a computer-implemented method of vehicle collision or crash fault determination using drone data may be provided. The method may include (1) receiving image, audio, and/or other drone data, at or via a remote server (and/or one or more remote processors) associated with an insurance provider, from one or more drones (or drone transceivers) via wireless communication or data transmission, the drone data received recording, showing, capturing, detailing, or otherwise being associated with a scene of a vehicle collision or crash and being generated, captured, collected, or gathered by the one or more drones (and/or associated drone sensors, cameras, imaging devices, audio or visual recording devices, and/or other drone-mounted electronic devices) before, during, and/or after the vehicle collision or crash, the vehicle collision or crash involving an insured autonomous or semi-autonomous vehicle covered by an insurance policy issued by the insurance provider; (2) analyzing, at or via the remote server, the drone data received; (3) assigning, at or via the remote server, a percentage of fault to the insured autonomous or semi-autonomous vehicle involved in the vehicle collision or crash based upon the analysis of the drone data; and/or (4) adjusting or updating, at or via a remote server, a premium, rate, reward, or discount for the insurance policy of the insured autonomous or semi-autonomous vehicle based upon the percentage of fault of the vehicle collision or crash that is assigned to the insured autonomous or semi-autonomous vehicle from analysis of the drone data. The method may include additional, fewer, or alternate actions, including those discussed elsewhere herein.

For example, the method may further include generating a wireless communication, at or via the remote server, related to the adjusted or updated insurance policy; and/or transmitting the wireless communication from the remote server to a mobile or computing device of an owner of the insured autonomous or semi-autonomous vehicle for presentation of the adjusted or updated insurance policy to the owner. The method may further include generating, at or via the remote server, an estimated insurance claim for the owner of the insured autonomous or semi-autonomous vehicle based upon the analysis of the drone data; and/or transmitting the estimated insurance claim from the remote server to a mobile or computing device of the owner their review, approval, and/or modification of the estimated insurance claim.

The drone data may be used to determine a percentage of fault for (1) human drivers; (2) autonomous or semi-autonomous vehicles; (3) road conditions; (4) traffic conditions; (5) weather conditions; and/or (6) road construction. Also, the drone data showing (or otherwise associated with) the scene of the vehicle collision or crash before, during, and/or after the vehicle collision or crash may be used to reconstruct a series of events leading up to the vehicle collision or crash and build a virtual simulation of the vehicle collision or crash that shows each vehicle involved, and their respective direction of travel and/or speed before, during, and/or after the vehicle collision or crash.

IX. Exemplary Method of Determining Fault

In another aspect, a computer-implemented method of vehicle collision or crash fault determination using drone data may be provided. The drone data may include various types of data associated with a vehicle collision or crash, such as video of the vehicle collision or crash, images of the vehicle collision or crash, telematics data received from one or more vehicles involved in the vehicle collision or crash, etc. The method may include receiving, by one or more processors, drone data via wireless communications. The drone data may be generated by one or more drones and associated with a scene of a vehicle collision or crash, and the vehicle collision or crash may involve an insured vehicle covered by an insurance policy issued by an insurance provider. The method may include one or more processors assigning a percentage of fault to each driver involved in the vehicle collision or crash based upon an analysis of the drone data, and calculating, by one or more processors, pricing related to the insurance policy based upon the percentage of fault assigned to the driver of the insured vehicle.

The one or more processors may additionally or alternatively transmit data to a mobile computing device of the insured driver, and the mobile computing device, upon receiving the data, may display pricing related to the insurance policy. The determination of fault percentage may use drone data analyzed by the one or more processors, which may include the consideration of information from human drivers, information from autonomous or semi-autonomous vehicles, the road conditions, traffic conditions, weather conditions, and/or road construction.

Additionally or alternatively, the method may include the one or more processors generating insurance claim form data for the insured driver based upon the analysis of the drone data and/or the one or more processors transmitting the insurance claim form data to a computing device. The one or more processors may then process the insurance claim form data as part of an insurance claim associated with the insurance policy. The one or more processors may additionally or alternatively assign the percentage of fault by analyzing any portion of the drone data, which may include an analysis of the telematics data.

X. Exemplary Server for Determining Fault

In yet another aspect, a server associated with an insurance provider is disclosed. The server includes a communication unit configured to receive drone data via wireless communications. The drone data may include various types of data associated with a vehicle collision or crash, such as video of the vehicle collision or crash, images of the vehicle collision or crash, telematics data received from one or more vehicles involved in the vehicle collision or crash, etc. The drone data may be generated by one or more drones and associated with a scene of a vehicle collision or crash, and the vehicle collision or crash may involve an insured vehicle covered by an insurance policy issued by an insurance provider.

The server may also include a processor configured to (1) assign a percentage of fault to each driver involved in the vehicle collision or crash based upon an analysis of the drone data, and (2) calculate pricing related to the insurance policy based upon the percentage of fault assigned to the driver of the insured vehicle. Additionally or alternatively, the communication unit may be configured to transmit data to a mobile computing device of the insured driver, and the mobile computing device, upon receiving the data, may display pricing related to the insurance policy.

The processor may be configured to analyze the drone data to determine the fault percentage, which may include the consideration of information from human drivers, information from autonomous or semi-autonomous vehicles, the road conditions, traffic conditions, weather conditions, and/or road construction. Additionally or alternatively, the processor may be may configured to generate insurance claim form data for the insured driver based upon the analysis of the drone data and/or to transmit the insurance claim form data to a computing device. The processor may then process the insurance claim form data as part of an insurance claim associated with the insurance policy. The processor may additionally or alternatively assign the percentage of fault by analyzing any portion of the drone data, which may include an analysis of the telematics data.

XI. Exemplary Non-Transitory Computer Readable Media for Determining Fault

In still another aspect, a non-transitory computer readable media is provided. The non-transitory computer readable media may have instructions stored thereon that, when executed by a processor, cause the processor to: (1) receive drone data via wireless communications, (2) assign a percentage of fault to each driver involved in the vehicle collision or crash based upon an analysis of the drone data, and (3) calculate pricing related to the insurance policy based upon the percentage of fault assigned to the driver of the insured vehicle. The drone data may be generated by one or more drones and associated with a scene of a vehicle collision or crash, and the vehicle collision or crash may involve an insured vehicle covered by an insurance policy issued by an insurance provider. The drone data may include various types of data associated with a vehicle collision or crash, such as video of the vehicle collision or crash, images of the vehicle collision or crash, telematics data received from one or more vehicles involved in the vehicle collision or crash, etc.

The non-transitory computer readable media may also include instructions to cause the processor to transmit data to a mobile computing device of the insured driver, and upon receiving the data, the mobile computing device may display the pricing related to the insurance policy. The non-transitory computer readable media may also include instructions to cause the processor to determine fault percentage by analyzing the drone data, which may include the consideration of information from human drivers, information from autonomous or semi-autonomous vehicles, the road conditions, traffic conditions, weather conditions, and/or road construction.

Additionally or alternatively, non-transitory computer readable media may also include instructions to cause the processor to generate insurance claim form data for the insured driver based upon the analysis of the drone data, and may cause the processor to transmit the insurance claim form data to a computing device. The computing device may process the insurance claim form data as part of an insurance claim associated with the insurance policy. The processor may additionally or alternatively assign the percentage of fault by analyzing any portion of the drone data, which may include an analysis of the telematics data.

XII. Additional Considerations

UAVs are described throughout the disclosure as being dispatched, deployed, or otherwise instructed to travel to one or more locations to perform various functions. As will be appreciated by those of ordinary skill in the relevant art(s), UAVs may be instructed to navigate to a specific location via any suitable techniques, such as referencing a postal address, a landmark, a location received in terms of latitude and longitude coordinates, etc. When a UAV is instructed to navigate to a geographic location and/or to perform various functions associated with a geographic location, the geographic location may defined in any suitable manner, such as a geofenced coordinate boundary, for example. Regardless of the specific purpose of the information collected by a UAV as further provided below, a UAV may receive instructions, collect information, execute various actions, store information, and/or transmit collected information in any suitable manner.

Furthermore, throughout the disclosure, functions to be performed by one or more UAVs may be explained as being performed by a single UAV, such as UAV 200, for example, for purposes of brevity. In the aspects described herein, any described aspects may be performed by a single UAV or any suitable number of additional UAVs. The number of UAVs used to collect data may be based upon the size of the vehicle collision or crash, the number of vehicles involved, the time-sensitive nature regarding when the data needs to be collected, etc.

In some aspects, the various UAV functions may be performed by UAVs maneuvering with or without a tethered system. For example, in some aspects, one or more UAVs may fly untethered to carryout various functions. In other aspects, however, one or more UAVs may utilize a tethering system while flying (or other means of locomotion) within a radius governed by the length of the tether. Such tethering systems may be particularly useful, for example, when higher power requirements are required, such that one or more UAVs may receive power via the tether instead of draining their respective internal batteries. UAV 200 may include additional, fewer, or alternate actions, including those discussed elsewhere herein.

With the foregoing, an insurance customer may opt into a rewards, insurance discount, or other type of program. After the insurance customer provides their affirmative consent, an insurance provider drone or UAV may collect image data of insured assets before (and/or after) an insurance-related event, including those events discussed elsewhere herein. For instance, drone data may be collected before, during, and/or after a vehicle collision or crash, such as with the insured's permission. In return, risk averse drivers and/or vehicle owners (such as owners or autonomous or semi-autonomous vehicles with safety features or technology) may not be unfairly penalized for vehicle collisions or crashes that were not their fault, but rather were caused by another vehicle or driver.

In one aspect, drone or UAV data, and/or other data, including the types of data discussed elsewhere herein, may be collected or received by an insurance provider remote server, such as via direct or indirect wireless communication or data transmission from a drone or UAV, after a customer affirmatively consents or otherwise opts into an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles, and/or (ii) vehicle operators or passengers.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or temporarily configured circuitry (e.g., configured by software) may be driven by cost/time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for executing actions with one or more UAVs, collecting information via one or more UAVs, and/or and utilizing this collected information through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method of vehicle collision or crash fault determination using drone data, the method comprising:

receiving, at a mobile computing device of a user, an indication of a vehicle collision or crash, the vehicle collision or crash involving an insured vehicle associated with the user and covered by an insurance policy issued by an insurance provider;

presenting, in response to receiving the indication of the vehicle collision or crash, on a display of the mobile computing device of the user, one or more selectable options to the user for requesting one or more drones be dispatched to a scene of the vehicle collision or crash;

automatically dispatching, in response to the user selecting at least one of the one or more selectable options, by one or more processors, the one or more drones to be dispatched to the scene of the vehicle collision or crash;

receiving, by the one or more processors, drone data via wireless communications, the drone data being generated by the one or more drones and the drone data being associated with the scene of the vehicle collision or crash;

performing, by the one or more processors, an analysis of the drone data associated with the vehicle collision or crash;

assigning, by the one or more processors, a percentage of fault to each driver involved in the vehicle collision or crash based upon the analysis of the drone data; and calculating, by one or more processors, pricing related to the insurance policy based upon the percentage of fault assigned to the driver of the insured vehicle.

2. The computer-implemented method of claim 1, further comprising:

transmitting, by the one or more processors, data regarding the pricing related to the insurance policy to the mobile computing device, and displaying, by the mobile computing device, upon receiving the data, the pricing related to the insurance policy.

3. The computer-implemented method of claim 1, wherein the act of assigning the percentage of fault includes analyzing the drone data to consider information selected from the group consisting of:

human drivers;
autonomous or semi-autonomous vehicles; road conditions;
traffic conditions; weather conditions; and road construction.

4. The computer-implemented method of claim 1, further comprising:

generating, by the one or more processors, insurance claim form data for the driver of the insured vehicle based upon the analysis of the drone data.

5. The computer-implemented method of claim 4, further comprising:

transmitting, by the one or more processors, the insurance claim form data to a computing device; and processing, by the computing device, the insurance claim form data as part of an insurance claim associated with the insurance policy.

6. The computer-implemented method of claim 1, wherein the drone data includes data selected from the group consisting of:

video of the vehicle collision or crash; images of the vehicle collision or crash; and telematics data received from one or more vehicles involved in the vehicle collision or crash.

7. The computer-implemented method of claim 6, wherein the act of assigning the percentage of fault includes analyzing the telematics data.

8. A server associated with an insurance provider, comprising:

a communication unit configured to receive drone data via wireless communications, wherein the drone data is generated by one or more drones and associated with a scene of a vehicle collision or crash, and wherein the vehicle collision or crash involves an insured vehicle associated with a user covered by an insurance policy issued by an insurance provider; and a processor configured to:
receive an indication of the vehicle collision or crash from the user;

present, in response to a receipt of the indication of the vehicle collision or crash, one or more selectable options to the user for requesting one or more drones be dispatched to a scene of the vehicle collision or crash via a display of a mobile computing device associated with the user;

automatically dispatch, in response to the user selecting at least one of the one or more selectable options, the one or more drones to be dispatched to the scene of the vehicle collision or crash;

perform an analysis of the drone data associated with the vehicle collision or crash;

assign a percentage of fault to each driver involved in the vehicle collision or crash based upon the analysis of the drone data; and calculate pricing related to the insurance policy based upon the percentage of fault assigned to the driver of the insured vehicle.

9. The server of claim 8, wherein the communication unit is further configured to transmit data to the mobile computing device, and wherein the mobile computing device is configured to display the pricing related to the insurance policy upon receiving the data.

10. The server of claim 8, wherein the processor is further configured to assign the percentage of fault by analyzing the drone data to consider information selected from the group consisting of:

human drivers;
autonomous or semi-autonomous vehicles; road conditions;
traffic conditions; weather conditions; and
road construction.

11. The server of claim 8, wherein the processor is further configured to generate insurance claim form data for the driver of the insured vehicle based upon the analysis of the drone data.

12. The server of claim 11, wherein the processor is further configured to transmit the insurance claim form data to an external computing device; and wherein the external computing device is configured to process the insurance claim form data as part of an insurance claim associated with the insurance policy.

13. The server of claim 8, wherein the drone data includes data selected from the group consisting of:

video of the vehicle collision or crash; images of the vehicle collision or crash; and telematics data received from one or more vehicles involved in the vehicle collision or crash.

14. The server of claim 13, wherein the processor is further configured to assign the percentage of fault by analyzing the telematics data.

15. A non-transitory computer readable media having instructions stored thereon that, when executed by a processor, cause the processor to:

receive an indication of a vehicle collision or crash from a user, the vehicle collision or crash involving an insured vehicle associated with the user and covered by an insurance policy issued by an insurance provider;

present, in response to a receipt of the indication of the vehicle collision or crash and on a display of a mobile computing device of the user, one or more selectable options to the user for requesting one or more drones be dispatched to a scene of the vehicle collision or crash;

automatically dispatch, in response to the user selecting at least one of the one or more selectable options, the one or more drones to be dispatched to the scene of the vehicle collision or crash;

receive drone data via wireless communications, wherein the drone data is generated by the one or more drones and associated with the scene of the vehicle collision or crash;

perform an analysis of the drone data associated with the vehicle collision or crash; assign a percentage of fault to each driver involved in the vehicle collision or crash based upon the analysis of the drone data; and calculate pricing related to the insurance policy based upon the percentage of fault assigned to the driver of the insured vehicle.

16. The non-transitory computer readable media of claim 15, further including instructions that, when executed by a processor, cause the processor to transmit data regarding the pricing related to the insurance policy to the mobile computing device, and wherein the mobile computing device, upon receiving the data, displays the pricing related to the insurance policy.

17. The non-transitory computer readable media of claim 15, wherein the instructions to assign the percentage fault include instructions that, when executed by a processor, cause the processor to assign the percentage of fault by analyzing the drone data to consider information selected from the group consisting of:

human drivers;
autonomous or semi-autonomous vehicles;
road conditions;
traffic conditions;
weather conditions; and
road construction.

18. The non-transitory computer readable media of claim 15, further including instructions that, when executed by a processor, cause the processor to generate insurance claim form data for the driver of the insured vehicle based upon the analysis of the drone data.

19. The non-transitory computer readable media of claim 18, further including instructions that, when executed by a processor, cause the processor to transmit the insurance claim form data to a computing device, and wherein the computing device processes the insurance claim form data as part of an insurance claim associated with the insurance policy.

20. The non-transitory computer readable media of claim 15, wherein the drone data includes data selected from the group consisting of:

video of the vehicle collision or crash;
images of the vehicle collision or crash; and
telematics data received from one or more vehicles involved in the vehicle collision or crash, and
wherein the instructions to assign the percentage fault include instructions that, when executed by a processor, cause the processor to assign the percentage of fault by analyzing the telematics data.

* * * * *